United States Patent
Hosseini et al.

(10) Patent No.: US 11,696,298 B2
(45) Date of Patent: Jul. 4, 2023

(54) BLIND DECODING LIMITS

(71) Applicant: QUALCOMM Incorporated, San Diego, CA (US)

(72) Inventors: Seyedkianoush Hosseini, San Diego, CA (US); Huilin Xu, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 3 days.

(21) Appl. No.: 17/099,335

(22) Filed: Nov. 16, 2020

(65) Prior Publication Data

US 2021/0153177 A1 May 20, 2021

Related U.S. Application Data

(60) Provisional application No. 62/936,534, filed on Nov. 17, 2019.

(51) Int. Cl.
*H04W 72/23* (2023.01)
*H04W 72/53* (2023.01)

(52) U.S. Cl.
CPC ........... *H04W 72/23* (2023.01); *H04W 72/53* (2023.01)

(58) Field of Classification Search
CPC ........... H04W 72/042; H04W 72/0493; H04W 72/23
See application file for complete search history.

(56) References Cited

U.S. PATENT DOCUMENTS

| | | | | |
|---|---|---|---|---|
| 2020/0154412 | A1 | 5/2020 | Lee et al. | |
| 2020/0154413 | A1* | 5/2020 | Hosseini | H04L 5/0053 |
| 2020/0296606 | A1* | 9/2020 | Mendoza | H04W 24/04 |
| 2020/0329389 | A1* | 10/2020 | Hosseini | H04L 5/0053 |
| 2020/0351644 | A1* | 11/2020 | Yang | H04W 72/0446 |
| 2020/0351896 | A1* | 11/2020 | Taherzadeh Boroujeni | H04W 72/044 |

(Continued)

OTHER PUBLICATIONS

Asia Pacific Telecom: "PDCCH Enhancements for NR URLLC", 3GPP Draft, 3GPP TSG-RAN WG1 Meeting #99, R1-1912252, 3rd Generation Partnership Project (3GPP), Mobile Competence Centre, 650, Route Des Lucioles, F-06921, Sophia-Antipolis Cedex, France, vol. RAN WG, No. Reno, USA, Nov. 18, 2019-Nov. 12, 2019, Nov. 9, 2019 (Nov. 9, 2019), XP051823323, 5 pages, Retrieved from the Internet: URL: https://ftp.3gpp.org/tsg_ran/WG1_RL1 / TSGR1_99/Docs/R1-1912252.zip R1 -1912252 PDCCH enhancements for NR URLLC.docx [retrieved on Nov. 9, 2019] p. 1-p. 3 figure 1 table 1.

(Continued)

*Primary Examiner* — Abdeltif Ajid
(74) *Attorney, Agent, or Firm* — Patterson+ Sheridan, L.L.P.; Kevin T. Cheatham

(57) ABSTRACT

Certain aspects of the present disclosure provide techniques for allocating a resource budget for blinding decoding among various types of DCI. A method that may be performed by a user equipment (UE) includes allocating a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by the UE; and monitoring, from a network entity, PDCCH candidates in accordance with the allocated resource budget.

28 Claims, 11 Drawing Sheets

(56) References Cited

U.S. PATENT DOCUMENTS

2020/0367080 A1* 11/2020 Salah ................ H04W 52/0261
2021/0258861 A1*  8/2021 Wang .................... H04W 48/10
2021/0352633 A1* 11/2021 Tiirola .............. H04W 72/0453

OTHER PUBLICATIONS

International Search Report and Written Opinion—PCT/US2020/060901—ISA/EPO—dated Mar. 1, 2021-03-01.
Nokia, et al., "On the PDCCH Enhancements for NR URLLC", 3GPP Draft, 3GPP TSG-RAN WG1 Ad-Hoc Meeting 1901, R1-1900927 URLLC DL Control, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 24, 2019, Jan. 20, 2019 (Jan. 20, 2019), XP051593771, 15 pages, Retrieved from the Internet: URL: http://www.3gpp.org/ftp/Meetings%5F3GPP%5FSYNC/RAN1/Docs/R1%2D1900927%2Ezip [retrieved on Jan. 20, 2019] p. 3-p. 6 Section 5; p. 11-p. 13 tables 3-1, 5-1, 5-2.
NTT Docomo, et al., "PDCCH Enhancements for URLLC," 3GPP Draft, 3GPP TSG RAN WG1 #99, R1-1912885, 3rd Generation Partnership Project (3GPP), Mobile Competence Centre, 650, Route Des Lucioles, F-06921, Sophia-Antipolis Cedex, France, vol. RAN WG1, No. Reno, US; Nov. 18, 2019-Nov. 22, 2019, Nov. 9, 2019 (Nov. 9, 2019), XP051823665, 12 pages, Retrieved from the Internet: URL: https://ftp.3gpp.org/tsg_ran/WG1_RL1/TSGR1_99/Docs/R1-1912885.zip R1-1912885.docx [retrieved on Nov. 9, 2019] Sections 2.3-4.4; p. 8-p. 11.

* cited by examiner

BLIND DECODING LIMITS

CROSS-REFERENCE TO RELATED APPLICATION

The present Application for Patent claims priority to U.S. Provisional Application No. 62/936,534, filed Nov. 17, 2019, which is assigned to the assignee of the present application and hereby expressly incorporated by reference herein in its entirety.

BACKGROUND

Field of the Disclosure

Aspects of the present disclosure relate to wireless communications, and more particularly, to techniques for allocating resource budget for blind decoding.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include allocation of a resource budget for monitoring a control channel.

Certain aspects provide a method for wireless communication. The method generally includes allocating a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by the UE; and monitoring, from a network entity, PDCCH candidates in accordance with the allocated resource budget.

Certain aspects provide a method for wireless communication. The method generally includes allocating a resource budget per a span of symbols among a first type of DCI and a second type of DCI, wherein the resource budget includes a number of PDCCH BDs and a number of CCEs supported by a UE; transmitting, to the UE, signals indicating DCI via PDCCH candidates allocated to the resource budget; and communicating with the UE based on the indicated DCI.

Certain aspects provide an apparatus for wireless communication. The apparatus generally includes a memory, a processor, and a receiver. The processor is coupled to the memory, and the processor and the memory are configured to allocate a resource budget per a span of symbols among a first type of DCI and a second type of DCI, wherein the resource budget includes a number of PDCCH BDs and a number of CCEs supported by the apparatus. The receiver is configured to monitor, from a network entity, PDCCH candidates in accordance with the allocated resource budget.

Certain aspects provide an apparatus for wireless communication. The apparatus generally includes a memory, a processor, and a transceiver. The processor is coupled to the memory, and the processor and the memory are configured to allocate a resource budget per a span of symbols among a first type of DCI and a second type of DCI, wherein the resource budget includes a number of physical PDCCH BDs and a number of CCEs supported by a UE. The transceiver is configured to transmit, to the UE, signals indicating DCI via one or more of the PDCCH candidates allocated to the resource budget, and communicate with the UE based on the indicated DCI.

Certain aspects provide an apparatus for wireless communication. The apparatus generally includes means for allocating a resource budget per a span of symbols among a first type of DCI and a second type of DCI, wherein the resource budget includes a number of PDCCH BDs and a number of CCEs supported by the apparatus; and means for monitoring, from a network entity, PDCCH candidates in accordance with the allocated resource budget.

Certain aspects provide an apparatus for wireless communication. The apparatus generally includes means for allocating a resource budget per a span of symbols among a first type of DCI and a second type of DCI, wherein the resource budget includes a number of PDCCH BDs and a number of CCEs supported by a UE; means for transmitting, to the UE, signals indicating DCI via PDCCH candidates allocated to the resource budget; and means for communicating with the UE based on the indicated DCI.

Certain aspects provide computer readable medium having instructions stored thereon for allocating a resource budget per a span of symbols among a first type of DCI and a second type of DCI, wherein the resource budget includes a number of physical PDCCH BDs and a number of CCEs supported by the UE; and monitoring, from a network entity, PDCCH candidates in accordance with the allocated resource budget.

Certain aspects provide computer readable medium having instructions stored thereon for allocating a resource budget per a span of symbols among a first type of DCI and a second type of DCI, wherein the resource budget includes a number of PDCCH BDs and a number of CCEs supported by UE; transmitting, to the UE, signals indicating DCI via PDCCH candidates allocated to the resource budget; and communicating with the UE based on the indicated DCI.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for allocating a resource budget on blind decoding. Certain aspects of the present disclosure provide various techniques for allocating a resource budget for monitoring PDCCH candidates among various types of DCI and/or wireless communication services. The various resource budget allocations described herein may enable performing blind decodes and scheduling resources for separate wireless communication services (e.g., eMBB services and/or URLLC services). For instance, the resource budget described herein may enable a UE to prioritize the blind decoding of PDCCH candidates associated with URLLC services in accordance with various BD/CCE limits associated with such URLLC services.

The following description provides examples of allocating a resource budget for monitoring PDCCH candidates in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
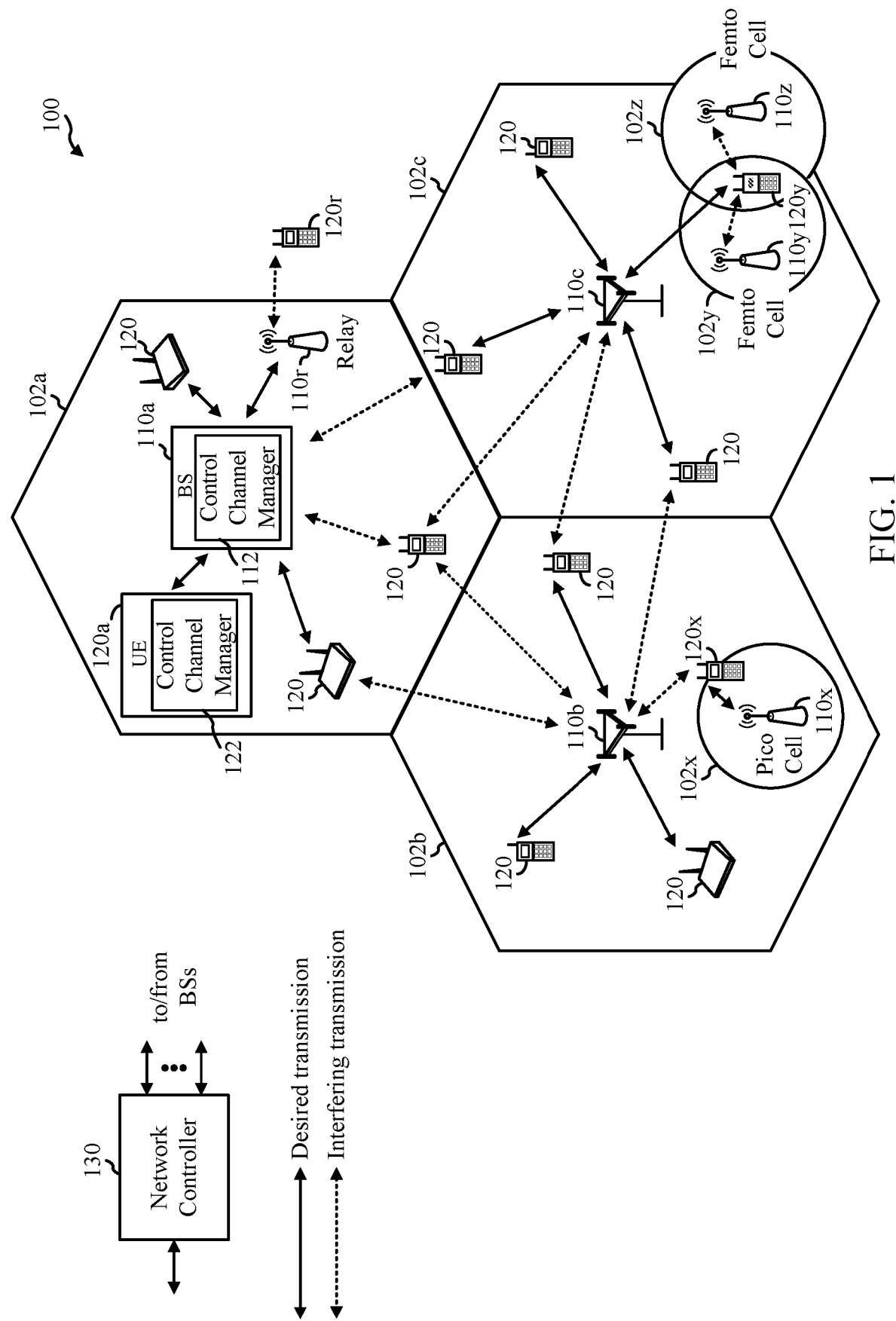
FIG. 1 is a block diagram conceptually illustrating an example telecommunications system, in accordance with certain aspects of the present disclosure.

FIG. 1 illustrates an example wireless communication network 100 in which aspects of the present disclosure may be performed. The wireless communication network 100 may be an NR system (e.g., a 5G NR network). The BS 110a includes a control channel manager 112 that allocates a resource budget per a span of symbols among a first type of DCI and a second type of DCI, where the resource budget includes a number of PDCCH BDs and a number of CCEs supported by a UE (e.g., UE 120a) for blind decoding PDCCH candidates in one or more search spaces, in accordance with aspects of the present disclosure. The UE 120a includes a control channel manager 122 that allocates a resource budget per span among a first type of DCI and a second type of DCI, in accordance with aspects of the present disclosure.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
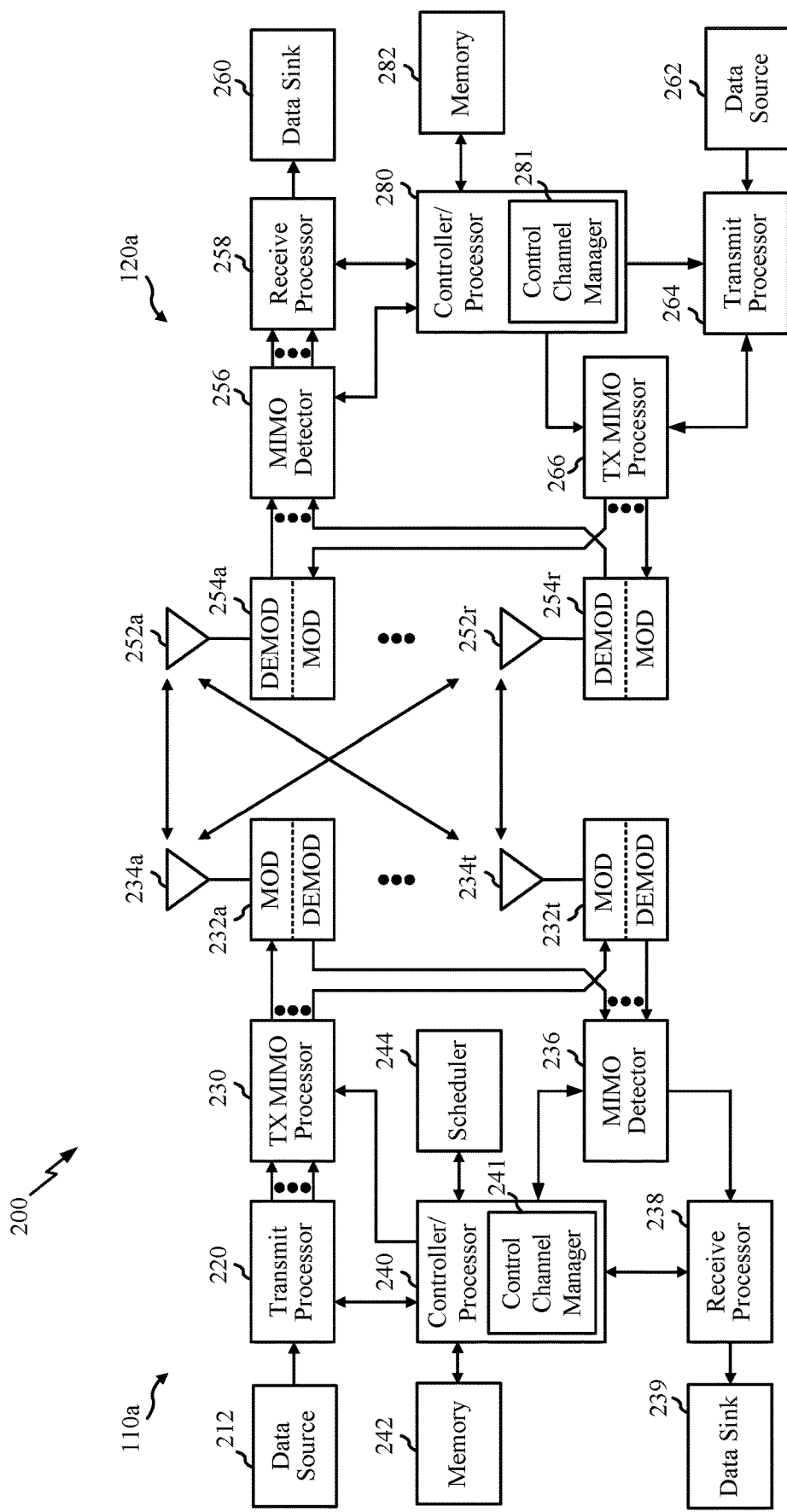
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and PBCH demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a control channel manager 241 that allocates a resource budget per span among a first type of DCI and a second type of DCI, according to aspects described herein. As shown in FIG. 2, the controller/processor 280 of the UE 120a has a control channel manager 281 that allocates a resource budget per span among a first type of DCI and a second type of DCI, according to aspects described herein. Although shown at the Controller/Processor, other components of the UE 120a and BS 110a may be used to perform the operations described herein.

Figure 3:
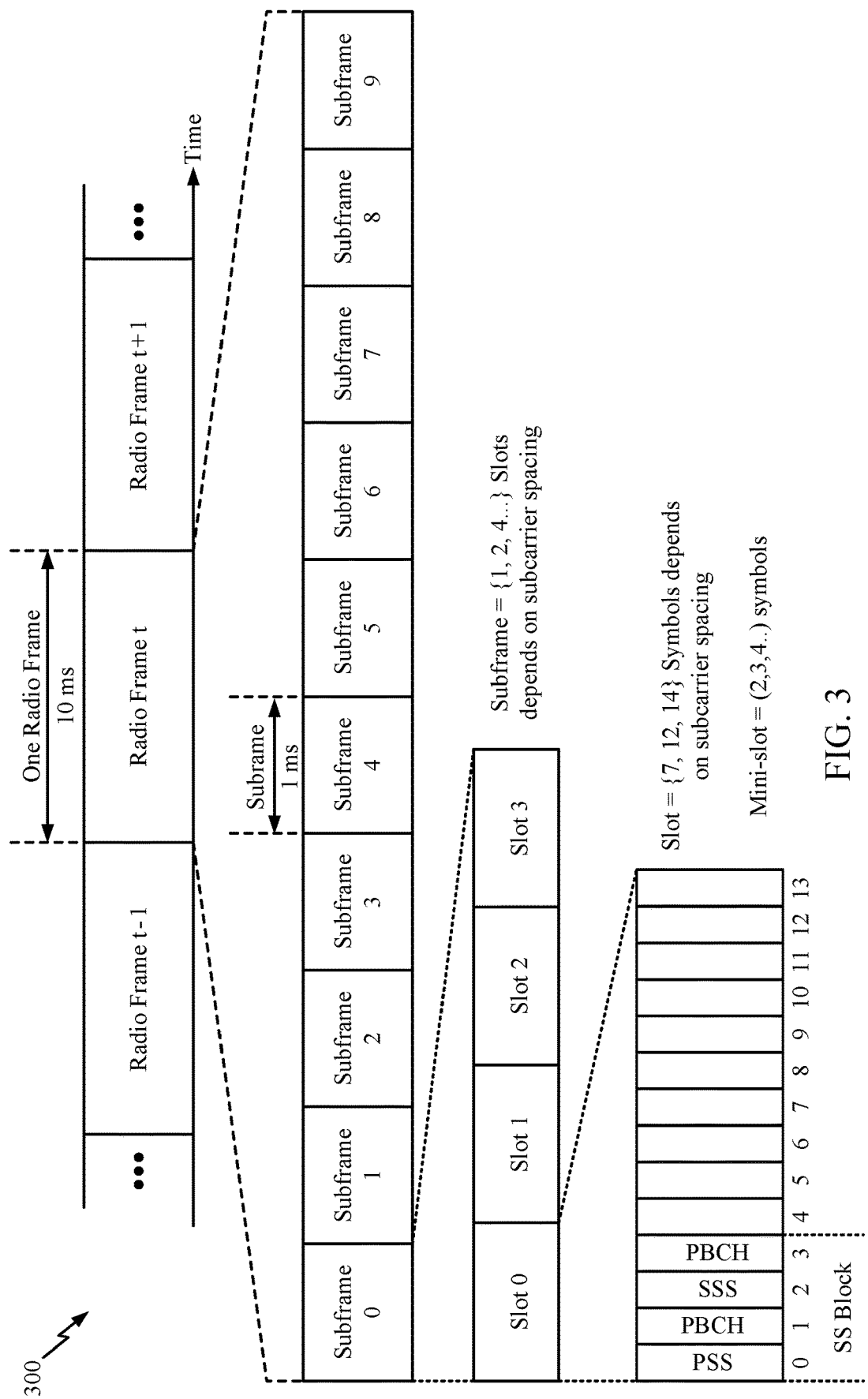
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing (SCS). The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

Example Blind Decoding Limits

In certain wireless communication systems (e.g., 5G NR systems), a UE may support various wireless communication services including, but not limited to, eMBB services and URLLC services. eMBB services, for example, may facilitate augmented reality or virtual reality, three-dimensional streaming video, various cloud applications, etc. In aspects, URLLC services may enable industrial automation, remote surgeries or medical procedures, self-driving cars, mission critical applications, etc. A UE may use blind decoding of PDCCH candidates to receive certain control information (such as such as radio resource control (RRC) elements, medium access control (MAC) control elements, or downlink control information (DCI) messages). For example, radio resources (e.g., frequency domain and/or time domain DL/UL resources) for various wireless communication services (such as eMBB services and/or URLLC services) may be scheduled via downlink control signaling on a PDCCH. In aspects, PDCCH demodulation may be based on demodulation reference signals (DM-RSs) transmitted in a search space. A PDCCH search space may be split into a common search space (CSS) and UE-specific search space (USS).

Figure 4:
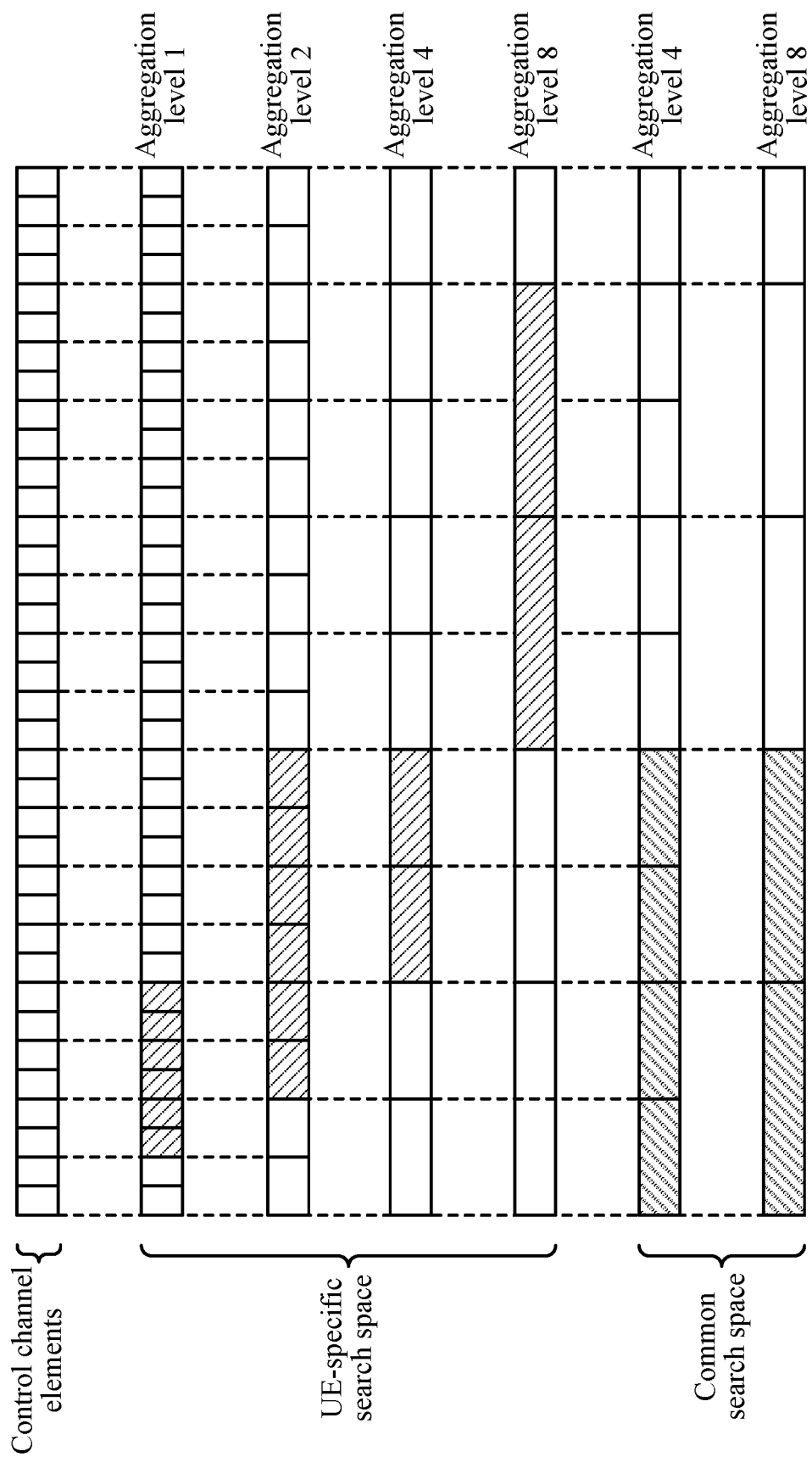
FIG. 4 illustrates a diagram of an example search space associated with different aggregation levels, in accordance with certain aspects of the present disclosure.

As an example, FIG. 4 illustrates a diagram of an example search space associated with different aggregation levels (ALs) for various users, according to an aspect of the present disclosure. A UE may search aggregation levels 1, 2, 4, and 8 in the UE-specific search space and aggregation levels 4 and 8 in the common search space. At each aggregation level, the UE may perform blind decoding for 2 different DCI lengths on the specified number of PDCCH candidates as illustrated in FIG. 4, which results in 44 blind decodes. Each PDCCH may be transmitted using a specific aggregation level (e.g., 1, 2, 4, and 8), where Control Channel Elements (CCEs) may be the smallest unit. An aggregation level may refer to a specific number of CCEs allocated to a PDCCH. While the example illustrated in FIG. 4 assumes an LTE search space, the techniques described herein may be applied to allocate resources across different types of search spaces, such as different NR search spaces and/or combinations of search spaces of different RATs. For example, under NR, AL 1 may have one CCE; AL 2 may have two CCEs; AL 4 may have four CCEs; AL 8 may have eight CCEs; and AL 16 may have 16 CCEs.

A UE may monitor a set of PDCCH candidates in one or more control resource sets (CORESETs) on an active DL bandwidth part (BWP) on each activated serving cell configured with PDCCH monitoring according to corresponding search space sets where monitoring implies decoding each PDCCH candidate according to the monitored DCI formats. In NR, the number of non-overlapping CCEs and blind decodes (BDs) may be restricted on a per carrier basis of a serving cell. As used herein, the number of BDs may refer to the number of monitored PDCCH candidates or the number of PDCCH candidates a UE is capable of decoding within a certain time frame, such as a slot or span of consecutive symbols in a slot. As an example, at a 15 kHz subcarrier spacing (SCS), the maximum number of BDs per slot per serving cell supported by a UE may be 44 BDs, and the maximum number of non-overlapping CCEs per slot per serving cell supported by a UE may be 56 CCEs. Other SCSs may have separate limitations for the BDs and CCEs.

In aspects, PDCCH monitoring capability may have a limit on the number of non-overlapping CCEs and/or BDs on a per span basis, where a span includes a certain number of consecutive symbols in a slot. Each span may include the monitoring occasions of different search space sets of the same or different control resource sets (CORESETs).

Figure 5:
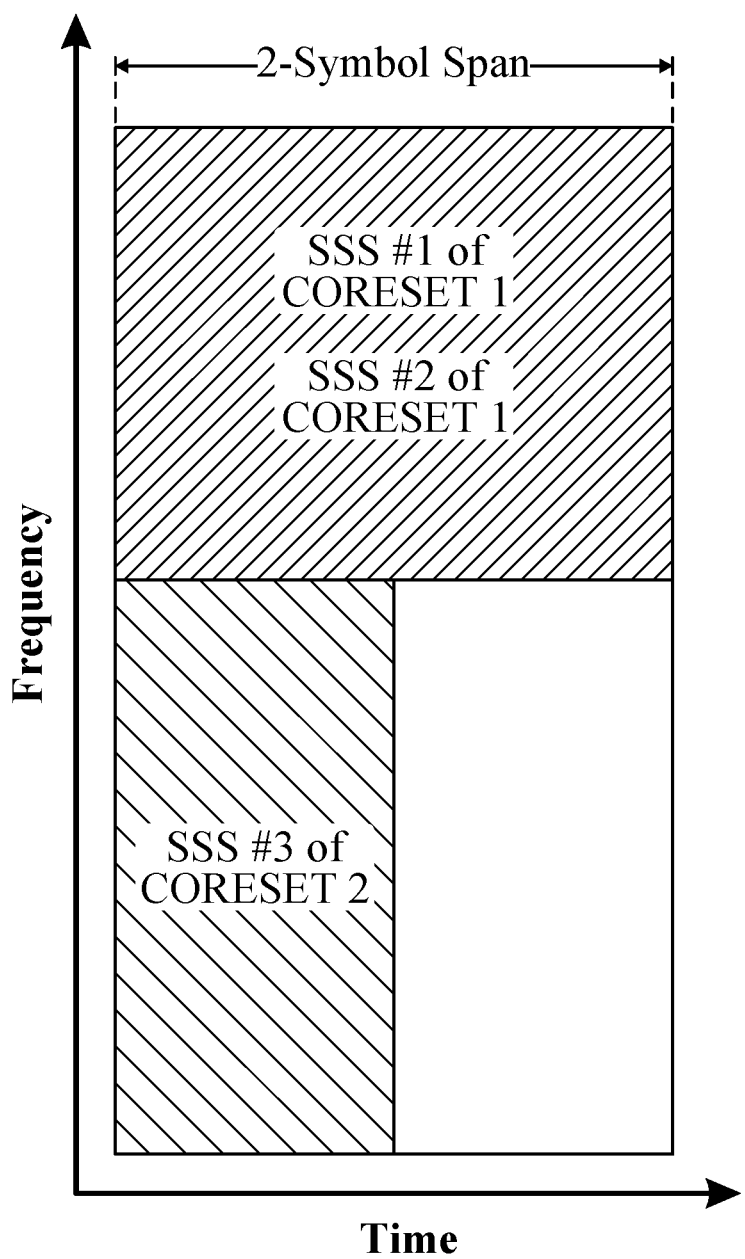
FIG. 5 illustrates a diagram of an example span with multiple search spaces, in accordance with certain aspects of the present disclosure.

As an example, FIG. 5 illustrates two CORESETs (CORESET 1 and CORESET 2) within a 2-symbol span where two search space sets (SSS #1 and SSS #2) are fully overlapping in CORESET 1, in accordance with certain aspects of the present disclosure. Each search space set of a given CORESET is configured with a number of PDCCH candidates per AL. For example, a search space set may include a number of PDCCH candidates $M_s^{(L)}$ per CCE aggregation level L, for example, by CCE aggregation level 1, CCE aggregation level 2, CCE aggregation level 4, CCE aggregation level 8, and CCE aggregation level 16, respectively. A search space set may have one more of PDCCH candidates per aggregation level. In aspects, a PDCCH candidate may refer to a certain number of CCEs at a specific CCE aggregation level (e.g., AL 1, 2, 4, or 16) in a search space set. In certain aspects, a search space set may be referred to as a search space.

A UE may not expect any two PDCCH monitoring occasions on an active DL BWP, for a same search space set or for different search space sets, in a same CORESET to be separated by a non-zero number of symbols that is smaller than the CORESET duration. That is, PDCCH monitoring occasions of multiple search spaces associated with the same CORESET can be fully overlapping in the time and frequency domains, but a UE may not expect the PDCCH monitoring occasions to be partially overlapping in the frequency domains.

Figure 6:
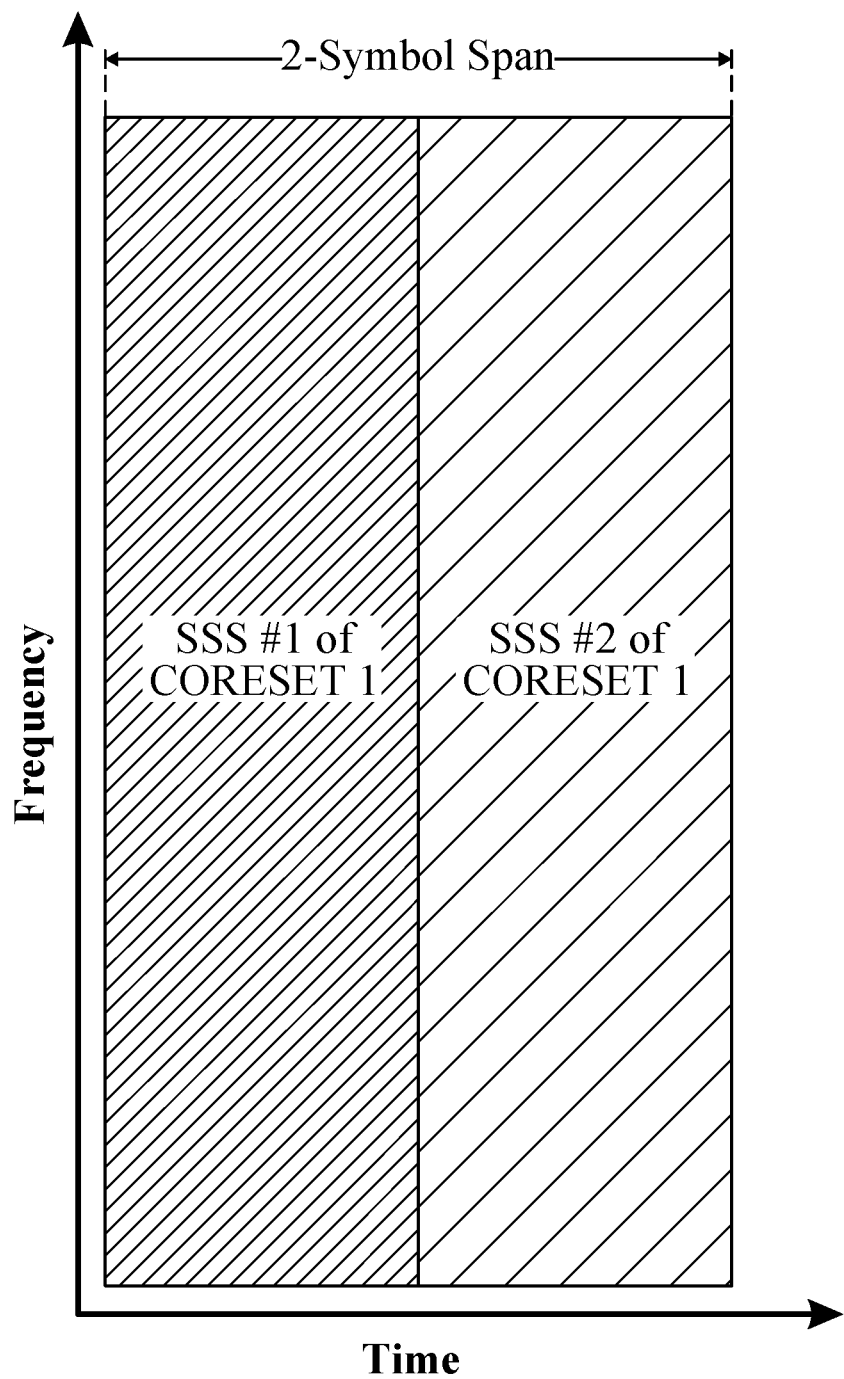
FIG. 6 illustrates a diagram of an example span with search spaces starting at different symbols, in accordance with certain aspects of the present disclosure.

In certain aspects, the search space sets may start from the same symbol of the span such as the first symbol of the span. For example, the search space sets depicted in FIG. 5 all start from the first symbol of the span. In certain aspects, a span may include PDCCH monitoring occasions of multiple search space sets of a given CORESET starting at different symbols of the span. For example, FIG. 6 illustrates a 2-symbol span having a CORESET with two search space sets (SSS #1 and SSS #2), where the SSS #1 starts at the first symbol of the span, and the SSS #2 starts at the second symbol of the span, in accordance with certain aspects of the present disclosure.

In aspects, the PDCCH monitoring occasions within spans may be configured in terms of (X, Y), where, in same or different search spaces, there may be a minimum time separation of X OFDM symbols (including the cross-slot boundary case) between the start of two spans, and where each span is of length up to Y consecutive OFDM symbols of a slot. In other words, if a UE monitors PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y. In aspects, spans may not overlap. Multiple spans may be within a single slot. In aspects, the same span pattern may repeat in every slot. The separation between consecutive spans within and across slots may be unequal but the same (X, Y) limit may be satisfied by all spans. PDCCH monitoring occasions may be within one span.

In certain aspects, the maximum number of BDs and CCEs per slot may be increased compared to previously supported levels. For example, suppose at a 15 kHz SCS, the BD limit of 44 per slot for eMBB services is uniformly distributed across 7 spans under (X, Y)=(2, 2) configuration, and an increased BD limit of 88 per slot for URLLC services is uniformly distributed across 7 spans under the same (X, Y) configuration. In the former case, the number of BDs per span is 6, and in the latter case, the number of BDs per span is 12.

For example, in order to determine a suitable span pattern, first a bitmap b(1), 0<=1<=13 may be generated, where b(1)=1 if symbol 1 of any slot is part of a monitoring occasion, b(1)=0 otherwise. The first span in the span pattern begins at the smallest 1 for which b(1)=1. The next span in the span pattern begins at the smallest 1 not included in the previous span(s) for which b(1)=1.

For example, the span duration may be max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.

For example, for the set of monitoring occasions which are within the same span: processing one unicast DCI scheduling DL and one unicast DCI scheduling UL per scheduled CC across this set of monitoring occasions for FDD; processing one unicast DCI scheduling DL and two unicast DCI scheduling UL per scheduled CC across this set of monitoring occasions for TDD; and processing two unicast DCI scheduling DL and one unicast DCI scheduling UL per scheduled CC across this set of monitoring occasions for TDD. The number of different start symbol indices of spans for all PDCCH monitoring occasions per slot may be no more than floor (14/X), where X is minimum among values reported by UE. The number of different start symbol indices of PDCCH monitoring occasions per slot including PDCCH monitoring occasions may be no more than 7. The number of different start symbol indices of PDCCH monitoring occasions per half-slot including PDCCH monitoring occasions may be no more than 4 in a secondary cell.

As blind decoding impacts processing resources and battery life, a UE may have processing limits related to the number of PDCCH candidates that the UE can monitor within search spaces to receive certain control information. In aspects, as URLLC services may be more processing intensive due to latency and reliability demands as compared to eMBB services, the UE may dedicate more processing resources to URLLC services. As the UE may be monitoring the PDCCH candidates for the various types of DCI (eMBB formats or URLLC formats), the number of BDs and/or CCEs configured for eMBB services and/or URLLC services may exceed or fall below the maximum number of PDCCH candidates that the UE can monitor.

In aspects, the UE may receive monitoring occasions of different search space sets of a same CORESET are present in the same span according to various cases, including: in a first case, SSS1 of CORESET 1 for Release (Rel.) 16 DCI (URLLC services) and SSS2 of CORESET 1 for Rel. 15 DCI (eMBB services); in a second case, SSS1 of CORESET 1 for Rel. 16 DCI (URLLC services) and SSS2 of CORESET 1 for Rel. 15 and Rel. 16 DCI (URLLC and eMBB services); in a third case, SSS1 of CORESET 1 for scheduling PDSCH/PUSCH with a first type of processing time capability and SSS2 of CORESET1 for scheduling PDSCH/PUSCH with a second type of processing time capability; and in a fourth case, SSS1 of CORESET 1 for scheduling PDSCH/PUSCH with the second type of processing time capability and SSS2 of CORESET1 for scheduling PDSCH/PUSCH with the first type or second type of processing time capability. As used herein, Rel. 15 and/or Rel. 16 may refer to Release 15 and/or Release 16 of 3GPP 5G NR standards, such as Technical Specification (TS) 38.213 providing the characteristics of the physical layer procedures for control operations in 5G NR. Monitoring occasions of different search space sets of different CORESETs may be present in the same span. In such cases, there may be issues in allocating enough processing resources to blind decode PDCCH candidates among the various DCI formats and/or various types of wireless communication services supported by the UE.

Certain aspects of the present disclosure provide various techniques for allocating a resource budget for monitoring PDCCH among various types of DCI and/or wireless communication services. A resource budget may refer to the amount of processing resources that are assigned to a UE for monitoring a PDCCH. In certain aspects, the resource budget may be defined in terms of a maximum number of actions that a UE is allowed to or can perform and/or in terms of a maximum number of resources that the UE is allowed to or can process. For example, a resource budget may refer to a maximum number of actions (such as blind decodes) or a maximum number of resources (e.g., CCEs) that a UE is allowed to or can perform/process to monitor a PDCCH per a certain number of time-domain resources (such as per a span of symbols or per a slot of symbols).

The various resource budget allocations described herein may enable performing blind decodes for and scheduling various resources for separate wireless communication services (e.g., eMBB services and/or URLLC services). For instance, the resource budget allocations described herein may enable a UE to prioritize the blind decoding of PDCCH candidates associated with URLLC services in accordance with various BD/CCE limits associated with such URLLC services. In aspects, the resource budget allocations described herein may provide desirable data rates, desirable reliability (e.g., consistent data rates), and/or desirable latencies for various wireless communication services (e.g., eMBB services and/or URLLC services) due to processing resources being allocated among various wireless communication services (e.g., eMBB services and/or URLLC services).

In aspects, the resource budget allocations described herein may limit the number of BDs allocated to decode a DCI for PDSCH/PUSCH scheduling with DCI formats associated with URLLC when there is a single processing time capability configured on the carrier (e.g., an eMBB or URLLC processing time capability). In certain aspects, the resource budget may limit the number of BDs to decode a DCI for PDSCH/PUSCH scheduling with minimum processing timing capability when two processing timing capabilities are configured on the same carrier (e.g., eMBB and URLLC processing time capabilities). For example, out of 12 BDs per span, the number of BDs for a first type of DCI may not exceed 6, and the number of BDs for a second type of DCI may not exceed the remaining 6. A used herein, a type of DCI may include DCI scheduling PUSCH/PDSCH with one or more minimum processing time capabilities (e.g., eMBB and/or URLLC processing time capabilities) if a carrier is configured with more than one minimum processing time capabilities simultaneously.

In general, a UE has a capability/resource budget for performing a certain number of BDs and processing a certain number of CCEs, respectively. Aspects of the present disclosure provide techniques for splitting this resource budget (e.g., number of BDs or number of CCEs) across various types of DCI. As will be described in greater detail below, search space dropping (or BD candidate dropping) may be based on the allocated resource budget corresponding to the respective type of DCI.

Figure 7:
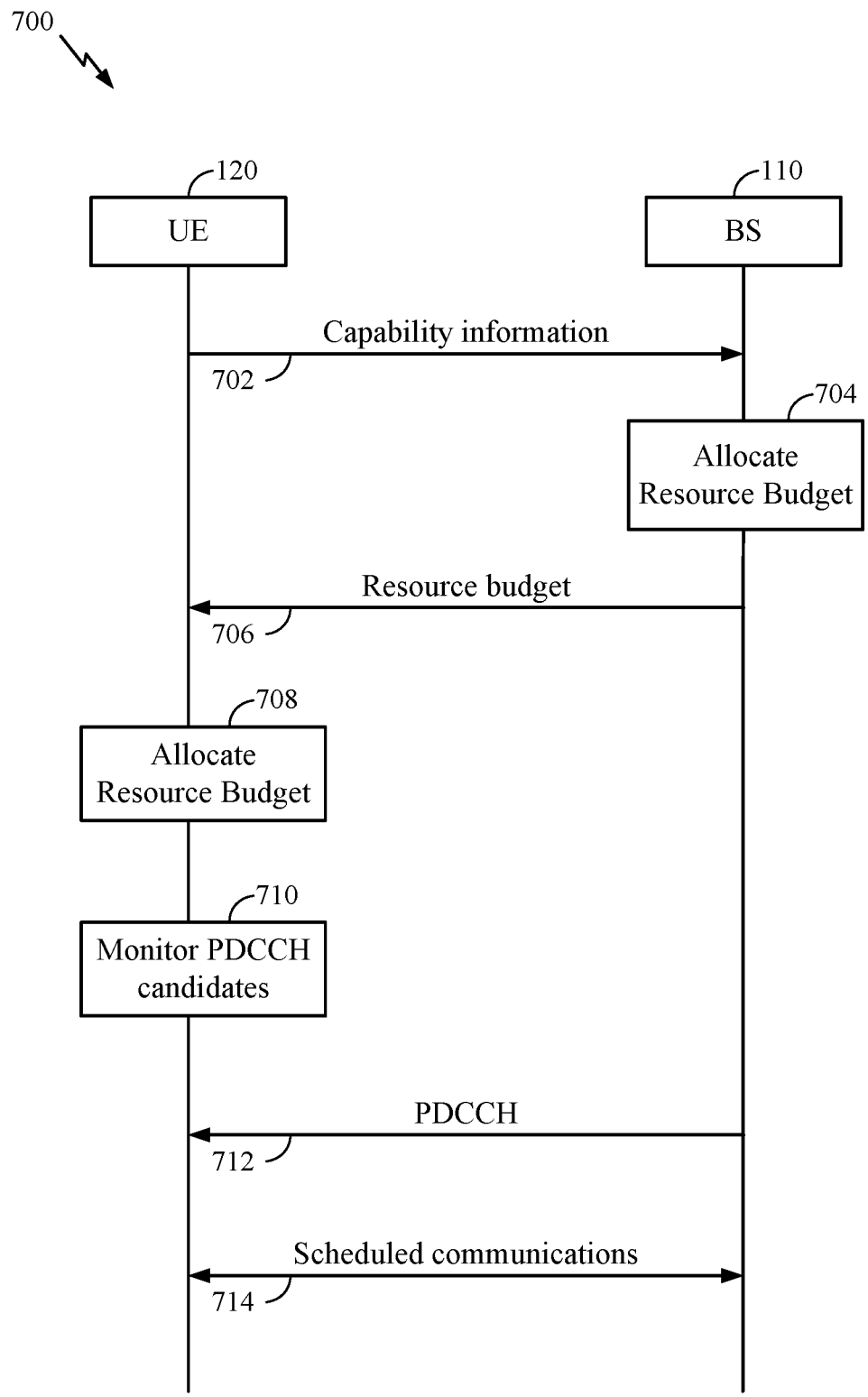
FIG. 7 is a call flow diagram illustrating example operations for allocating blind decodes and/or control channel elements, in accordance with certain aspects of the present disclosure.

FIG. 7 is a call flow diagram illustrating example operations 700 for allocating a number of BDs and/or CCEs among various types of DCI, in accordance with certain aspects. At 702, a UE 120 may transmit, to a BS 110, capability information indicating the PDCCH blind decoding/CCE monitoring capabilities of the UE, such as a maximum number of BDs and/or a maximum number of CCEs that the UE can monitor per slot or span per cell group, in carrier aggregation (e.g., per cell), or in total. As an example, the capability information may indicate the maximum number of BDs and CCEs the UE can monitor per slot.

At 704, the BS 110 may allocate a resource budget per a span of symbols among a first type of DCI (e.g., associated with eMBB services) and a second type of DCI (e.g., associated with URLLC services), where the resource budget includes a number of BDs and a number of CCEs supported by the UE 120. In aspects, the allocation at 704 may be based on the capability information received at 702. At 706, the BS 110 may transmit, to the UE 120, an indication of the allocated resource budget among the first type of DCI and second type of DCI. In aspects, the indication of the allocated resource budget may be implicit or explicit. For example, the indication may provide a resource budget on a per slot basis, and the UE 120 may derive a resource budget per span based on the slot-based resource budget, as further described herein with respect to FIGS. 8 and 9. In certain aspects, the indication may provide a first resource budget associated with the first type of DCI and/or a second resource budget associated with the type of DCI. In certain aspects, the number of BDs may include a first number of BDs associated with the first type of DCI and a second number of BDs associated with the second type of DCI.

At 708, the UE 120 may allocate a resource budget per a span of symbols among the first type of DCI and the second type of DCI. In aspects, the allocation at 708 may be based on the indication(s) received at 706. In certain aspects, the allocation at 708 may be based on a default allocation stored on the UE 120. At 710, the UE 120 may monitor PDCCH candidates from the BS 110 in accordance with the allocated resource budget at 708. For instance, the UE 120 may receive control signaling indicating DCI (e.g., UL/DL scheduling grants for eMBB and/or URLLC services) via PDCCH candidates from the BS 110 at 712. At 714, the UE 120 may communication with (e.g., transmitting data to and/or receiving data from) the BS 110 based on the indicated DCI.

Figure 8:
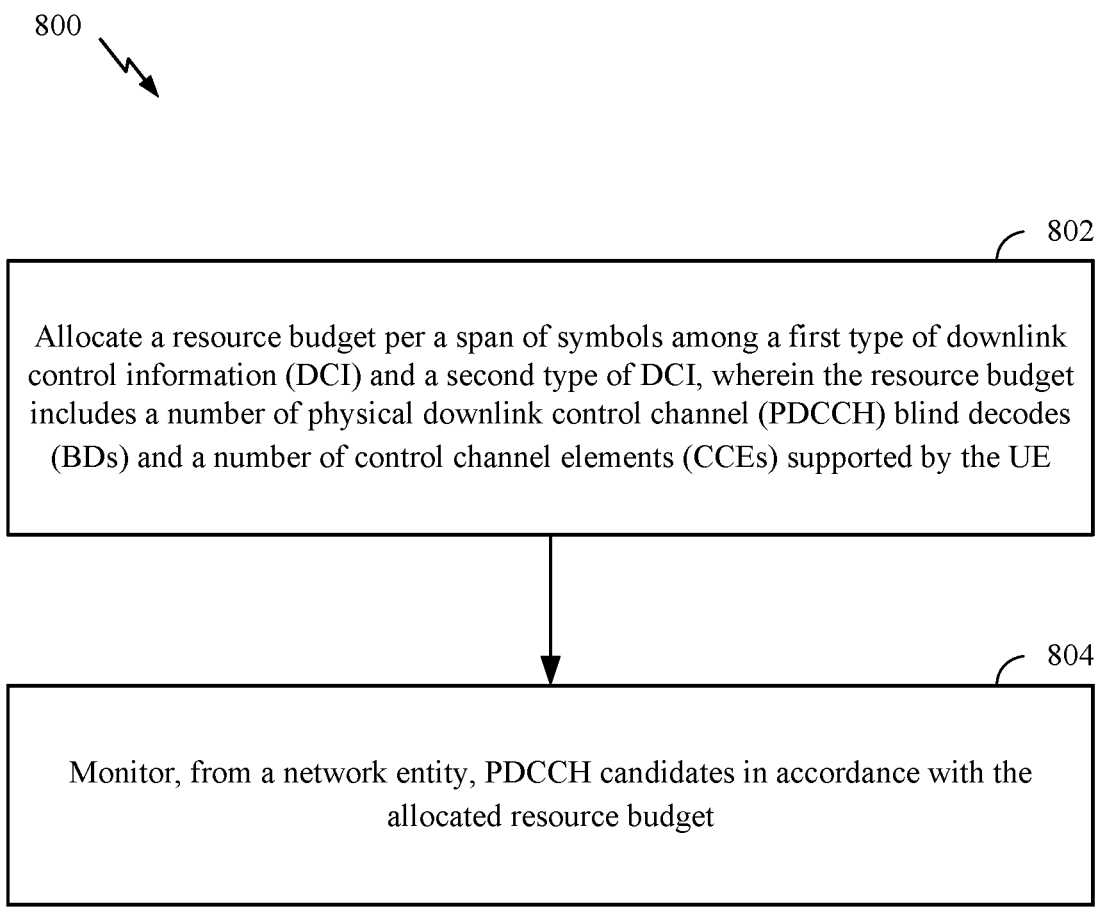
FIG. 8 is a flow diagram illustrating example operations for wireless communication by a UE, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., the UE 120a in the wireless communication network 100). Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin at 802, where the UE may allocate a resource budget per a span of symbols among a first type of DCI and a second type of DCI, where the resource budget includes a number of PDCCH BDs and a number of CCEs supported by the UE. At 804, the UE may monitor, from a network entity, PDCCH candidates in accordance with the allocated resource budget.

In aspects, the resource budget may include a maximum number of BDs supported by the UE to be performed per span of symbols, and the maximum number of BDs may be allocated among the first type of DCI and the second type of DCI. For instance, the number of PDCCH blind decodes may include a first number of PDCCH blind decodes associated with the first type of DCI and a second number of PDCCH blind decodes associated with the second type of DCI. In aspects, the summation of the first number of PDCCH blind decodes and the second number of PDCCH blind decodes may be less than or equal to a first threshold value per span of symbols (e.g., the number of BDs for Rel.

16 DCI+the number of BDs for Rel. 15 DCI<=total BD limit per span), such as the maximum number of BDs supported by the UE.

In aspects, the BDs associated with the first type of DCI and the second type of DCI may have separate thresholds per span. For instance, the first number of PDCCH blind decodes may be less than or equal to a second threshold value (e.g., the number of BDs for Rel. 16 DCI<=Threshold per span), and the second number of PDCCH blind decodes may be less than or equal to a third threshold value.

In aspects, the values for the various thresholds associated with the BDs may be allocated according to various rules and/or configurations. In aspects, a fixed ratio may be used to split the number of BDs between the Rel. 15 DCI monitoring and Rel. 16 DCI monitoring per span. In certain aspects, the ratio may be dependent on the (X, Y) span configuration as described herein. For example, the BDs per type of DCI may be equally split in the case where (X, Y)=(2, 2). As an example, with respect to operations 800, the second threshold value and the third threshold value may be allocated from the first threshold value according to a configured ratio between the first type of DCI and the second type of DCI. For example, given a ratio 1:2, if the total BD limit is 12, 4 BDs may be allocated to DCI for Rel. 16 and 8 BDs may be allocated for DCI for Rel. 15.

In aspects, with respect to operations 800, the second threshold value and the third threshold value may be determined by a PDCCH configuration associated with the first type of DCI and the second type of DCI. The PDCCH configuration may include a first number of PDCCH candidates associated with first search spaces configured for the first type of DCI and a second number of PDCCH candidates associated with second search spaces configured for the second type of DCI. In aspects, the determination may be proportional to the number of PDCCH candidates. The second threshold value is proportional to the first number of PDCCH candidates, and the third threshold value is proportional to the second number of PDCCH candidates.

For example, suppose there are 20 PDCCH candidates across all search spaces present in one span, where 12 PDCCH candidates are associated with search spaces configured for monitoring Rel. 15, and PDCCH candidates 8 are associated with search spaces for Rel. 16, which results in 60% of 20 is for Rel. 15, and 40% for Rel. 16). The BDs may be split proportional to the PDCCH configuration. For example, if there are 12 BDs per span, 7 BDs may be allocated for Rel. 15 DCI, and 5 BDs may allocated for Rel. 16 DCI.

In aspects, the UE may count the BDs performed per type of DCI or count certain BDs before decoding and drop certain PDCCH candidates if the BDs reaches the various thresholds described herein. In other words, the UE may identify if there are processing resources available to BD a PDCCH candidate based on the various counting rules described herein, and if there are no remaining processing resources, the UE may refrain from processing certain PDCCH candidates. In certain aspects, the UE may expect to be configured with search spaces that satisfy the various counting rules described herein. The UE may perform the BD/CCE counting according to the various thresholds and/or various configurations described herein. In certain aspects, the BD/CCE counting rules described herein may take into account PDCCH candidates, which are associated with separate types of DCI and decodable based on the same blind decode (e.g., PDCCH candidates fully overlapping in the same CORESET with the same DCI size and the same/identical scrambling).

In aspects, the PDCCH candidates of operations 800 may include a first PDCCH candidate associated with the first type of DCI, and a second PDCCH candidate associated with a second type of DCI, where the first PDCCH candidate and the second PDCCH candidate are decodable based on the same blind decode. The first PDCCH candidate and the second PDCCH candidate may be considered decodable based on the same blind decode if at least one or more conditions are met, where the conditions include: the first PDCCH candidate and the second PDCCH candidate are in the same CORESET; the first PDCCH candidate and the second PDCCH candidate use a same set of CCEs; the first PDCCH candidate and the second PDCCH candidate have identical scrambling (e.g., the PDDCH candidates are scrambled with the same Radio Network Temporary Identifier (RNTI)); or the first type of DCI associated with the first PDCCH candidate and the second type of DCI associated with the second PDCCH candidate have a same DCI size.

In aspects, each BD may contribute to the counting of BDs associated with the different types of DCI, for example, Rel. 15 and Rel. 16 BDs. For example, when the UE blind decodes a candidate, and the DCI turns out to be for Rel. 15, the UE may count BD as 1 for Rel. 15 and 1 for Rel. 16. In aspects, monitoring the PDCCH candidates at 804 may include receiving and decoding the PDCCH candidates, and counting the first PDCCH candidate as 1 BD towards the first number of PDCCH blind decodes and counting the second PDCCH candidate as 1 BD towards the second number of PDCCH blind decodes, if the first type of DCI or the second type of DCI is detected among the first PDCCH candidate and the second PDCCH candidate of the decoded PDCCH candidates.

In aspects, if a first type of DCI (e.g., Rel. 15) is detected, the BD may contribute to counting of BDs associated with the second type of DCI (e.g., Rel. 16) but not vice versa. For example, when the UE blind decodes a candidate, and the DCI turns out to be for Rel. 15, the UE may count the BD as 1 for Rel. 15 and 1 for Rel. 16, but when the UE blind decodes a candidate, and the DCI turns out to be for Rel. 16, the UE counts the BD as 1 for Rel. 16, but not for Rel. 15. Such a scheme may enable a UE to prioritize processing resources to PDCCH candidates associated with a certain type of DCI. With respect to the operations 800, monitoring the PDCCH candidates at 804 may include the UE receiving and decoding the PDCCH candidates; and the UE counting the first PDCCH candidate as 1 BD towards the first number of PDCCH blind decodes and counting the second PDCCH candidate as 1 BD towards the second number of PDCCH blind decodes if only the first type of DCI is detected among the first PDCCH candidate and the second PDCCH candidate. The UE may count the second PDCCH candidate as 1 BD towards the second number of PDCCH blind decodes, but not counting the first PDCCH candidate towards the first number of PDCCH blind decodes, if only the second type of DCI is detected among the first PDCCH candidate and the second PDCCH candidate.

In aspects, the BD counting may be performed before attempting to decode the PDCCH candidate. In such a case, the BDs associated with the different types of DCI (e.g., the Rel. 15 and Rel. 16 BDs) may be counted separately. For example, if any overlapping PDCCH candidates associated with Rel. 15 and Rel. 16 can be decoded using the same BD (e.g., PDCCH candidates fully overlapping in the same CORESET and also having the same DCI size in the same set of CCEs and having the identical scrambling), the BDs are counted both in Rel. 15 BD number and Rel. 16 number.

With respect to the operations 800, monitoring the PDCCH candidates at 804 may include the UE counting, before decoding the PDCCH candidates, the first PDCCH candidate as 1 BD towards the first number of PDCCH blind decodes and counting the second PDCCH candidate as 1 BD towards the second number of PDCCH blind decodes separately.

In aspects, a certain type of DCI may be given priority in counting the BDs before decoding. For instance, BDs for Rel. 15 PDCCH candidates may be counted before the BDs for Rel. 16 PDCCH candidates, or vice versa. In aspects, the UE can reuse a BD for PDCCH candidates if there is a fully overlapping Rel. 15 PDCCH candidate that has been decoded using the same BD. In other words, before decoding fully overlapping PDCCH candidates, the UE may first count a BD towards the number of BDs allocated for Rel. 15, and then the UE may count the BD towards the number of BDs allocated for Rel. 16. After decoding the PDCCH candidates, if a Rel. 15 DCI is detected in the fully overlapping PDCCH candidates, the UE may reuse a BD for the Rel. 15 PDCCH candidates and/or the Rel. 16 PDCCH candidates. In other words, the UE may decrement the total number of BDs for a particular type of DCI if a Rel. 15 DCI is detected in the fully overlapping PDCCH candidates. With respect to the operations 800, monitoring the PDCCH candidates at 804 may include the UE counting, before decoding the PDCCH candidates, the first PDCCH candidate as 1 BD towards the first number of PDCCH blind decodes if PDCCH blind decodes are counted for the PDCCH candidates associated with the first type of DCI before PDCCH blind decodes are counted for the PDCCH candidates associated with the second type of DCI. That is, the UE may count the first PDCCH candidate towards the first number of PDCCH blind decodes if PDCCH blind decodes for the PDCCH candidates associated with the first type of DCI are counted before PDCCH blind decodes for the PDCCH candidates associated with the second type of DCI.

In certain cases, monitoring the PDCCH candidates at 804 may include counting, before decoding the PDCCH candidates, the second PDCCH candidate as 1 BD towards the second number of PDCCH blind decodes if PDCCH blind decodes are counted for the PDCCH candidates associated with the second type of DCI before PDCCH blind decodes are counted for the PDCCH candidates associated with the first type of DCI. That is, the UE may count the second PDCCH candidate towards the second number of PDCCH blind decodes if PDCCH blind decodes for the PDCCH candidates associated with the second type of DCI are counted before PDCCH blind decodes for the PDCCH candidates associated with the first type of DCI.

In certain aspects, the resource budget may be defined in terms of a maximum number of CCEs that a UE is allowed to or can process per a span of symbols. For example, the resource budget may include a maximum number of CCEs supported by the UE to be processed per span of symbols, and the maximum number of CCEs may be allocated among the first type of DCI and the second type of DCI. The number of CCEs may include a first number of CCEs associated with the first type of DCI and a second number of CCEs associated with the second type of DCI. In aspects, the summation of the first number of CCEs and the second number of CCEs may be less than or equal to a fourth threshold value (e.g., the number of CCEs for Rel. 16 DCI+the number of CCEs for Rel. 15 DCI<=total CCE limit per span).

In aspects, the CCEs associated with the first type of DCI and the second type of DCI may have separate thresholds per span. For instance, the first number of CCEs may be less than or equal to a fifth threshold value (e.g., the number of CCEs for Rel. 16 DCI<=Threshold per span), and the second number of CCEs is less than or equal to a sixth threshold value.

In aspects, the values for the various thresholds associated with the CCEs may be allocated according to various rules and/or configurations, for example, as described herein with respect to the CCEs. In aspects, the fifth threshold value and the sixth threshold value are determined from the fourth threshold according to a configured ratio between the first type of DCI and the second type of DCI.

In certain aspects, the fifth threshold value and the sixth threshold value are determined by a PDCCH configuration associated with the first type of DCI and the second type of DCI. The PDCCH configuration includes a first number of PDCCH candidates associated with first search spaces configured for the first type of DCI and a second number of PDCCH candidates associated with second search spaces configured for the second type of DCI, where the fifth threshold value is proportional to the first number of PDCCH candidates, and the sixth threshold value is proportional to the second number of PDCCH candidates.

In aspects, the UE may count the CCEs processed per type of DCI and drop certain PDCCH candidates if the number of CCEs processed reaches the various thresholds described herein. As such, the UE may perform the CCE counting according to the various thresholds and/or various configurations. In certain aspects, the BD/CCE counting rules described herein may take into account PDCCH candidates, which are associated with separate types of DCI and able to be processed as the same set of CCEs (e.g., the CCEs are in same CORESET and in same set of resource elements, and the PDCCH candidates have same first symbol).

In aspects, monitoring the PDCCH candidates at 804 comprises the UE processing a plurality of CCEs, where the CCEs include a first set of one or more CCEs of a first PDCCH candidate associated with the first type of DCI and a second set of one or more CCEs of a second PDCCH candidate associated with second type of DCI. In aspects, the first set of one or more CCEs and the second set of one or more CCEs are able to be processed as a same set of one or more CCEs. In certain aspects, the first set of one or more CCEs and the second set of one or more CCEs are able to be processed as the same set of one or more CCEs if at least one or more conditions are met, where the conditions include: the first set of one or more CCEs and the second set of one or more CCEs are in a same CORESET; the first set of CCEs and the second set of one or more CCEs use a same set of resource elements (REs); or the first PDCCH candidate and the second PDCCH candidate have a same first symbol.

In aspects, each CCE may contribute to the counting of CCEs associated with the different types of DCI, for example, Rel. 15 and Rel. 16 CCEs. With respect to the operations 800, processing the CCEs may include the UE receiving and decoding the PDCCH candidates associated with the CCEs, and the UE counting the first set of one or more CCEs towards the first number of CCEs and counting the second set of one or more CCEs towards the second number of CCEs, if the first type of DCI or the second type of DCI is detected among the first PDCCH candidate and the second PDCCH candidate of the decoded PDCCH candidates.

In aspects, if the first type of DCI (e.g., Rel. 15) is detected, the CCE also contributes to the second type of DCI (e.g., Rel. 16) counting but not vice versa. With respect to the operations 800, processing the CCEs may include the UE receiving and decoding the first PDCCH candidate and the second PDCCH candidate. The UE may count the first set of one or more CCEs towards the first number of CCEs and count the second set of one or more CCEs towards the second number of CCEs, if only the first type of DCI is detected among the first PDCCH candidate and the second PDCCH candidate. The UE may count the second set of one or more CCEs towards the second number of CCEs, but not count the first set of one or more CCEs towards the first number of CCEs, if only the second type of DCI is detected among the first PDCCH candidate and the second PDCCH candidate.

In aspects, the CCE counting may be performed before attempting to decode the PDCCH candidate. In such a case, the CCEs associated with different types of DCI (e.g., the Rel. 15 and Rel. 16 CCEs) may be counted separately. For example, if any overlapping PDCCH candidates associated with Rel. 15 and Rel. 16 can be decoded using the same CCEs (e.g., PDCCH candidates fully overlapping in the same CORESET and also having the same DCI size in the same set of CCEs and having the identical scrambling), the CCEs associated with these PDDCH candidates are counted both in Rel. 15 CCE number and Rel. 16 CCE number. With respect to the operations 800, processing the CCEs may comprise the UE counting, before decoding the PDCCH candidates, the first set of one or more CCE towards the first number of CCEs and counting the second set of one or more CCE towards the second number of CCEs separately.

In aspects, a certain type of DCI may be given priority in counting the CCEs before decoding. In aspects, processing the CCEs comprises counting, before decoding the PDCCH candidates, the first set of one or more CCE towards the first number of CCEs if CCEs are counted for the PDCCH candidates associated with the first type of DCI before CCEs are counted for the PDCCH candidates associated with the second type of DCI. In certain aspects, the UE may count the second set of one or more CCEs towards the second number of CCEs if CCEs are counted for the PDCCH candidates associated with the second type of DCI before CCEs are counted for the PDCCH candidates associated with the first type of DCI.

A specific type of DCI may be associated with various types of wireless communication services, NR Releases, DCI formats, etc. In other words, a type of DCI may be defined in terms of a type of a wireless communication service (such as eMBB or URLLC) associated with the DCI (e.g., a type of wireless communication service scheduled by the DCI), a type of monitoring capability associated with the UE, a specific DCI format, a specific 5G NR Release. In aspects, the first type of DCI may be associated with a first type of wireless communication service; and the second type of DCI may be associated with a second type of wireless communication service. In certain aspects, the first type of wireless communication service may include an URLLC service; and the second type of wireless communication service may include an eMBB service. In aspects, the first type of wireless communication service may include a first NR Release (e.g., 3GPP NR Release 16) service or a first NR Release monitoring capability; and the second type of wireless communication service may include a second NR Release (e.g., 3GPP NR Release 15) or a second NR Release monitoring capability.

In aspects, the span of symbols may comprise consecutive symbols in a slot, where the consecutive symbols are a portion or segment of the slot, for example, as depicted in FIGS. 5 and 6. A span may be (or include) a number of consecutive symbols in a slot where the UE is configured to monitor PDCCH candidates (e.g., in the time domain and frequency domain). As an example, the span may have up to 2 or 3 consecutive symbols.

In aspects, monitoring the PDCCH candidates at 804 may include receiving, from the network entity, control signals indicating DCI (e.g., one or more UL/DL scheduling grants for eMBB services and/or URLLC services) via the PDCCH candidates. The UE may decode the PDCCH candidates associated with the control signals. In aspects, the UE may decode the PDCCH candidates according to the resource budget described herein with respect to PDCCH candidates that overlap with each other and are associated with different types of DCI or services. The UE may communicate with (e.g., transmitting data to and/or receiving data from) the network entity based on the indicated DCI. For example, the DCI may schedule a downlink transmission via specific time-frequency resources to the UE, and the UE may receive the downlink transmission from the network entity via the indicated time-frequency resources in the DCI.

Figure 9:
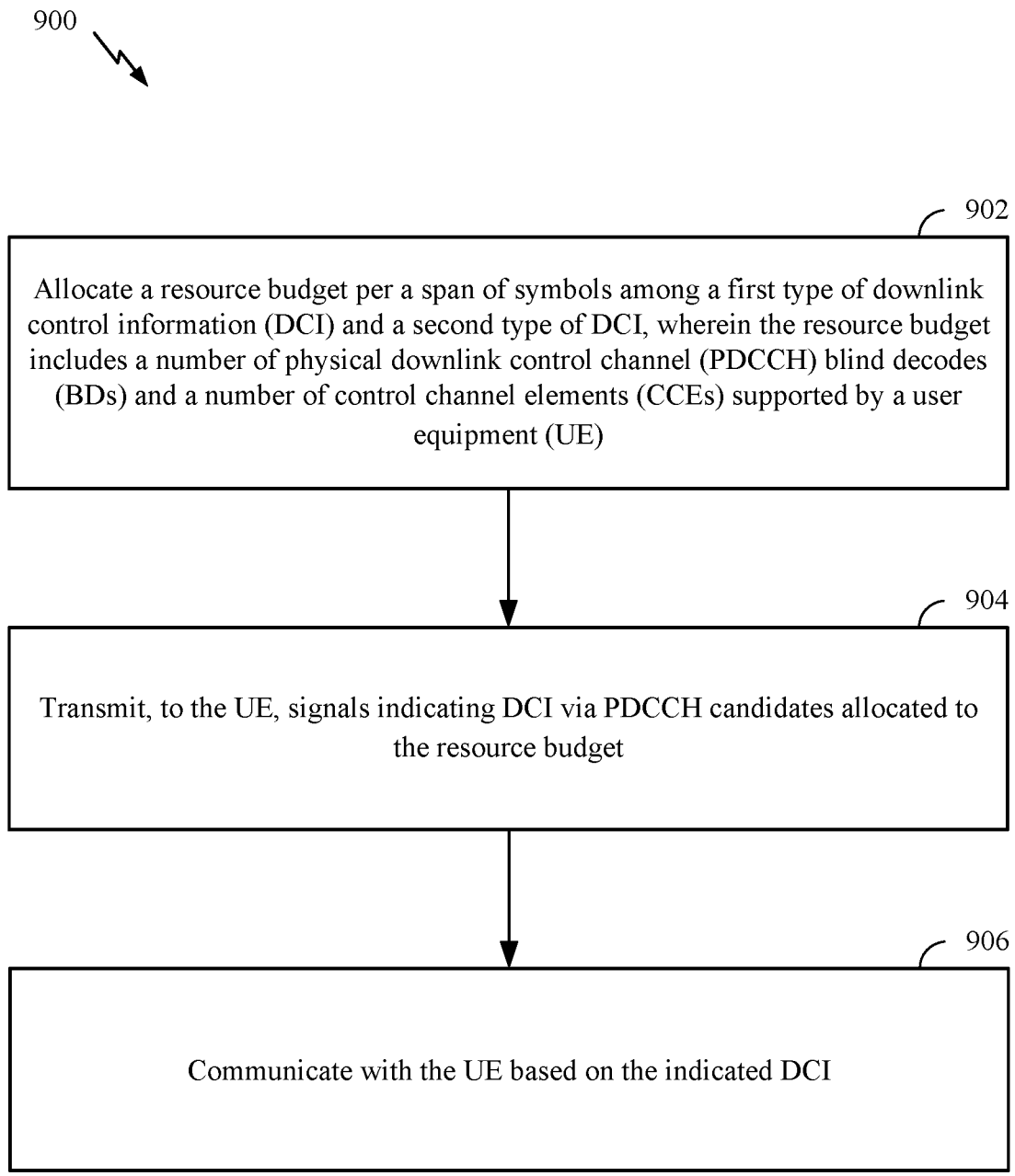
FIG. 9 is a flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. The operations 900 may be performed, for example, by a network entity (e.g., the BS 110*a* and/or network controller 130 in the wireless communication network 100). The operations 900 may be complimentary to the operations 800 performed by a UE. Operations 900 may be implemented as software components that are executed and run on one or more processors (e.g., controller/processor 240 of FIG. 2). Further, the transmission and reception of signals by the network entity in operations 900 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. In aspects, a network entity may refer to a communication device (e.g., a wireless communication device and/or a network communication device) in a wireless communication network, such as a base station (e.g., an eNB/gNB, DU, or TRP) and/or a network controller (e.g., a centralized unit (CU)).

The operations 900 may begin at 902, where the network entity may allocate a resource budget per a span of symbols among a first type of DCI and a second type of DCI, wherein the resource budget includes a number of PDCCH BDs and a number of CCEs supported by a UE. At 904, the network entity may transmit, to the UE, signals indicating DCI (e.g., one or more UL/DL scheduling grants for eMBB services and/or URLLC services) via PDCCH candidates allocated to the resource budget. At 906, the network entity may communicate with (e.g., transmitting data to and/or receiving data from) the UE based on the indicated DCI.

In aspects, the resource budget may include a maximum number of BDs supported by the UE to be performed per span of symbols, and the maximum number of BDs may be allocated among the first type of DCI and the second type of DCI. For instance, the number of PDCCH blind decodes may include a first number of PDCCH blind decodes associated with the first type of DCI and a second number of PDCCH blind decodes associated with the second type of DCI. In aspects, the summation of the first number of PDCCH blind decodes and the second number of PDCCH blind decodes may be less than or equal to a first threshold value per span of symbols (e.g., the number BDs for Rel. 16 DCI+the number of BDs for Rel. 15 DCI<=total BD limit per span).

In aspects, the BDs associated with the first type of DCI and the second type of DCI may have separate thresholds per span. For instance, the first number of PDCCH blind decodes may be less than or equal to a second threshold value (e.g., #BDs for Rel. 16 DCI<=Threshold per span), and the second number of PDCCH blind decodes may be less than or equal to a third threshold value.

In aspects, the values for the various thresholds associated with the BDs may be allocated according to various rules and/or configurations. In aspects, a fixed ratio may be used to split the number of BDs between the Rel. 15 DCI monitoring and Rel. 16 DCI monitoring per span. In certain aspects, the ratio may be dependent on the (X, Y) span configuration as described herein. For example, the BDs per type of DCI may be equally split in the case where (X, Y)=(2, 2). As an example, with respect to operations 900, the second threshold value and the third threshold value may be allocated from the first threshold value according to a configured ratio between the first type of DCI and the second type of DCI. For example, given a ratio 1:2, if the total BD limit is 12, 4 BDs may be allocated to DCI for Rel. 16 and 8 BDs may be allocated for DCI for Rel. 15.

In certain aspects, the allocation among the types of DCI may be proportional to various configurations. In aspects, the split may be based on PDCCH configuration for Rel. 15 and Rel. 16 such as proportional to the number of PDCCH candidates. For example, suppose there are 20 PDCCH candidates across all search spaces present in one span, where 12 PDCCH candidates are associated with search spaces configured for monitoring Rel. 15, and 8 PDCCH candidates are associated with search spaces for Rel. 16, which results in 60% for Rel. 15, and 40% for Rel. 16). The BDs may be split proportional to the PDCCH configuration. For example, if there are 12 BDs per span, 7 BDs may be allocated for Rel. 15 DCI, and 5 BDs may allocated for Rel. 16 DCI.

In aspects, with respect to operations 900, the second threshold value and the third threshold value may be determined by a PDCCH configuration associated with the first type of DCI and the second type of DCI. The PDCCH configuration may include a first number of PDCCH candidates associated with first search spaces configured for the first type of DCI and a second number of PDCCH candidates associated with second search spaces configured for the second type of DCI, where the second threshold value is proportional to the first number of PDCCH candidates, and the third threshold value is proportional to the second number of PDCCH candidates.

In aspects, the UE may expect to receive PDCCH candidates that satisfy the various thresholds described herein with respect to the BDs/CCEs. As such, the network entity may perform BD counting according to the various thresholds and/or various configurations described herein. In certain aspects, the BD/CCE counting rules described herein may take into account PDCCH candidates, which are associated with separate types of DCI and decodable based on the same blind decode (e.g., PDCCH candidates fully overlapping in the same CORESET with the same DCI size and identical scrambling).

In aspects, the PDCCH candidates of operations 900 may include a first PDCCH candidate associated with the first type of DCI, and a second PDCCH candidate associated with a second type of DCI, where the first PDCCH candidate and the second PDCCH candidate are decodable based on the same blind decode. The first PDCCH candidate and the second PDCCH candidate may be considered decodable based on the same blind decode if at least one or more conditions are met, where the conditions include: the first PDCCH candidate and the second PDCCH candidate are in the same CORESET; the first PDCCH candidate and the second PDCCH candidate use a same set of CCEs; the first PDCCH candidate and the second PDCCH candidate have identical scrambling (e.g., the PDDCH candidates are scrambled with the RNTI); or the first type of DCI associated with the first PDCCH candidate and the second type of DCI associated with the second PDCCH candidate have a same DCI size.

In aspects, each BD may contribute to the counting of BDs associated with the different types of DCI, for example, Rel. 15 and Rel. 16 BDs. With respect to the operations 900, transmitting the PDCCH candidates at 904 may include the network entity counting the first PDCCH candidate as 1 BD towards the first number of PDCCH blind decodes and counting the second PDCCH candidate as 1 BD towards the second number of PDCCH blind decodes, if the first type of DCI or the second type of DCI is transmitted via the first PDCCH candidate or the second PDCCH candidate.

In aspects, if a first type of DCI (e.g., Rel. 15) is transmitted, the BD may contribute to the counting of BDs associated with the second type of DCI (e.g., Rel. 16) but not vice versa. With respect to the operations 900, transmitting the PDCCH candidates at 904 may include the network entity counting the first PDCCH candidate as 1 BD towards the first number of PDCCH blind decodes and counting the second PDCCH candidate towards the second number of PDCCH blind decodes, if only the first type of DCI is transmitted among the first PDCCH candidate and the second PDCCH candidate. The network work entity may count the second PDCCH candidate as 1 BD towards the second number of PDCCH blind decodes, but not count the first PDCCH candidate towards the first number of PDCCH blind decodes, if only the second type of DCI is transmitted among the first PDCCH candidate and the second PDCCH candidate.

In aspects, the network entity may take into account that the UE may perform BD counting before attempting to decode the PDCCH candidate. In such a case, the BDs associated with different types of DCI (e.g., the Rel. 15 and Rel. 16 BDs) may be counted separately. If any overlapping PDCCH candidates associated with Rel. 15 and Rel. 16 can be decoded using the same BD (e.g., PDCCH candidates fully overlapping in the same CORESET and also having the same DCI size in the same set of CCEs and having the identical scrambling), the BDs are counted both in Rel. 15 BD number and Rel. 16 number. For example, with respect to the operations 900, transmitting the PDCCH candidates at 904 may include the network entity counting the first PDCCH candidate as 1 BD towards the first number of PDCCH blind decodes and counting the second PDCCH candidate as 1 BD towards the second number of PDCCH blind decodes separately.

In aspects, a certain type of DCI may be given priority in counting the BDs before decoding. That is, a specific order in counting the BDs may be applied based on the type of DCI associated with the BDs. For instance, BDs for Rel. 15 PDCCH candidates may be counted before the BDs for Rel. 16 PDCCH candidates, or vice versa. With respect to the operations 900, transmitting the PDCCH candidates at 904 may include the network entity counting the first PDCCH candidate as 1 BD towards the first number of PDCCH blind decodes if PDCCH blind decodes are counted for the PDCCH candidates associated with the first type of DCI before PDCCH blind decodes are counted for the PDCCH candidates associated with the second type of DCI. In certain cases, transmitting the PDCCH candidates at 904 may include the network entity counting the second PDCCH candidate as 1 BD towards the second number of PDCCH blind decodes if PDCCH blind decodes are counted for the PDCCH candidates associated with the second type of DCI before PDCCH blind decodes are counted for the PDCCH candidates associated with the first type of DCI.

In aspects, the resource budget may include a maximum number of CCEs supported by the UE to be processed per span of symbols, and the maximum number of CCEs may be allocated among the first type of DCI and the second type of DCI. For example, the number of CCEs may include a first number of CCEs associated with the first type of DCI and a second number of CCEs associated with the second type of DCI. In aspects, the summation of the first number of CCEs and the second number of CCEs is less than or equal to a fourth threshold value (e.g., the number of CCEs for Rel. 16 DCI+the number of CCEs for Rel. 15 DCI<=total CCE limit per span).

In aspects, the CCEs associated with the first type of DCI and the second type of DCI may have separate thresholds per span. For instance, the first number of CCEs may be less than or equal to a fifth threshold value (e.g., the number of CCEs for Rel. 16 DCI<=Threshold per span), and the second number of CCEs is less than or equal to a sixth threshold value.

In aspects, the values for the various thresholds associated with the CCEs may be allocated according to various rules and/or configurations, for example, as described herein with respect to the BDs. In aspects, the fifth threshold value and the sixth threshold value are determined from the fourth threshold according to a configured ratio between the first type of DCI and the second type of DCI.

In certain aspects, the fifth threshold value and the sixth threshold value are determined by a PDCCH configuration associated with the first type of DCI and the second type of DCI. The PDCCH configuration includes a first number of PDCCH candidates associated with first search spaces configured for the first type of DCI and a second number of PDCCH candidates associated with second search spaces configured for the second type of DCI, where the fifth threshold value is proportional to the first number of PDCCH candidates, and the sixth threshold value is proportional to the second number of PDCCH candidates.

In aspects, the UE may expect to receive PDCCH candidates that satisfy the various thresholds described herein with respect to the BDs/CCEs. As such, the network entity may perform CCE counting according to the various thresholds and/or various configurations as described herein. In certain aspects, the In certain aspects, the BD/CCE counting rules described herein may take into account PDCCH candidates, which are associated with separate types of DCI and able to be processed as the same set of CCEs (e.g., the CCEs are in same CORESET and in same set of resource elements, and the PDCCH candidates have same first symbol).

In aspects, the PDCCH candidates of operations 900 may include a first set of one or more CCEs of a first PDCCH candidate associated with the first type of DCI, and a second set of one or more CCEs of a second PDCCH candidate associated with second type of DCI, where the first set of one or more CCEs and the second set of one or more CCEs are able to be processed as a same set of one or more CCEs. In aspects, the first set of one or more CCEs and the second set of one or more CCEs are able to be processed as the same set of one or more CCEs if at least one or more conditions are met, where the conditions include: the first set of one or more CCEs and the second set of one or more CCEs are in a same CORESET; the first set of CCEs and the second set of one or more CCEs use a same set of resource elements (REs); or the first PDCCH candidate and the second PDCCH candidate have a same first symbol.

In aspects, each CCE may contribute to the counting of CCEs associated with the different types of DCI, for example, Rel. 15 and Rel. 16 CCEs. Transmitting the PDCCH candidates at 904 may include the network entity counting the first set of one or more CCEs towards the first number of CCEs and counting the second set of one or more CCEs towards the second number of CCEs, if the first type of DCI or the second type of DCI is transmitted via the first PDCCH candidate or the second PDCCH candidate, respectively.

In aspects, if the first type of DCI (e.g., Rel. 15) is transmitted, the CCEs may also contribute to the number of CCEs associated with the second type of DCI (e.g., Rel. 16) but not vice versa. With respect to the operations 900, transmitting the PDCCH candidates at 904 may include the network entity counting the first set of one or more CCEs towards the first number of CCEs and counting the second set of one or more CCEs towards the second number of CCE, if only the first type of DCI is transmitted among the first PDCCH candidate and the second PDCCH candidate. The network entity may count the second set of one or more CCEs towards the second number of CCEs, but not count the first set of one or more CCEs towards the first number of CCEs, if only the second type of DCI is transmitted among the first PDCCH candidate and the second PDCCH candidate.

In aspects, the network entity may take into account that the UE may perform CCE counting before attempting to decode the PDCCH candidate. In such a case, the CCEs associated with different types of DCI (e.g., the Rel. 15 and Rel. 16 CCEs) may be counted separately. For example, if any overlapping PDCCH candidates associated with Rel. 15 and Rel. 16 are transmitted using the same CCEs (e.g., PDCCH candidates fully overlapping in the same CORESET and also having the same DCI size in the same set of CCEs and having the identical scrambling), the CCEs associated with these PDDCH candidates are counted both in Rel. 15 CCE number and Rel. 16 CCE number. With respect to the operations 900, transmitting the PDCCH candidates at 904 may include the network entity counting the first set of one or more CCE towards the first number of CCEs and counting the second set of one or more CCE towards the second number of CCEs separately.

In aspects, a certain type of DCI may be given priority in counting the CCEs before decoding. For instance, CCEs for Rel. 15 PDCCH candidates may be counted before the CCEs for Rel. 16 PDCCH candidates, or vice versa. In aspects, transmitting the PDCCH candidates at 904 may include the network entity counting the first set of one or more CCE towards the first number of CCEs if CCEs are counted for the PDCCH candidates associated with the first type of DCI before CCEs are counted for the PDCCH candidates associated with the second type of DCI. In certain aspects, transmitting the PDCCH candidates at 904 may include the network entity counting the second set of one or more CCEs towards the second number of CCEs if CCEs are counted for the PDCCH candidates associated with the second type of DCI before CCEs are counted for the PDCCH candidates associated with the first type of DCI.

A specific type of DCI may be associated with various types of wireless communication services, NR Releases, DCI formats, etc. In aspects, the first type of DCI is associated with a first type of wireless communication service; and the second type of DCI is associated with a second type of wireless communication service. In certain aspects, the first type of wireless communication service includes an URLLC service; and the second type of wireless communication service includes an eMBB service. In aspects, the first type of wireless communication service includes a first NR Release (e.g., 3GPP NR Release 16) service; and the second type of wireless communication service includes a second NR Release (e.g., 3GPP NR Release 15).

In aspects, the span of symbols comprises consecutive symbols in a slot, where the consecutive symbols are a portion or segment of the slot, for example, as depicted in FIGS. 5 and 6.

While various examples are described with respect to counting/identifying the available resource budget assigned to Rel. 15 or Rel. 16 capabilities, aspects of the present disclosure may also be applied to a resource budget being allocated across other releases, services, or UE monitoring capabilities.

Figure 10:
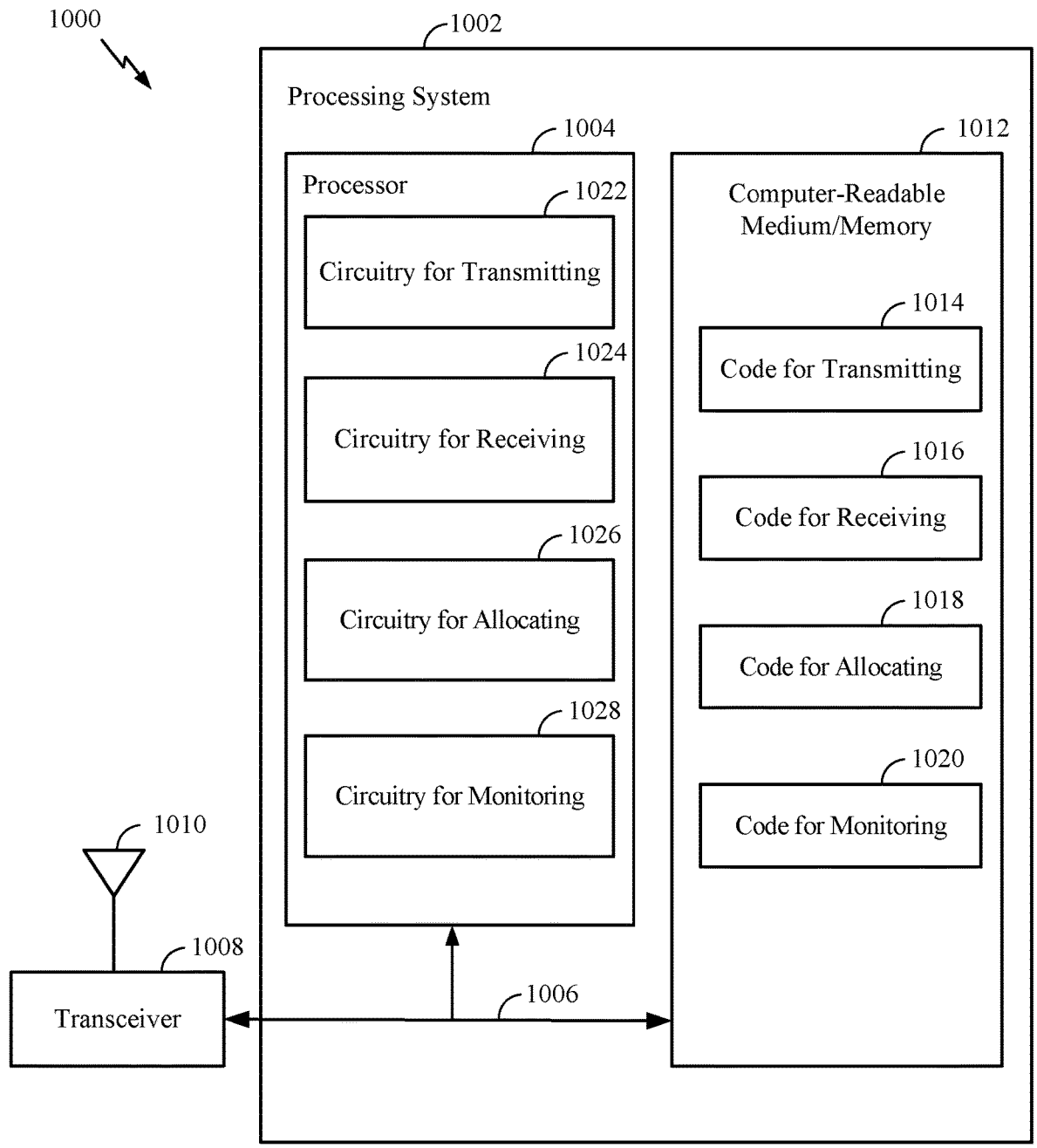
FIG. 10 illustrates a communications device (e.g., a UE) that may include various components configured to perform operations for the techniques disclosed herein in accordance with aspects of the present disclosure.

FIG. 10 illustrates a communications device 1000 (e.g., a UE) that may include various components (e.g., corresponding to means-plus-function components) configured to perform operations for the techniques disclosed herein, such as the operations illustrated in FIG. 8. The communications device 1000 includes a processing system 1002 coupled to a transceiver 1008 (e.g., a transmitter and/or receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for allocating a blind decoding resource budget. In certain aspects, computer-readable medium/memory 1012 stores code for transmitting 1014, code for receiving 1016, code for allocating 1018, and/or code for monitoring 1020. In certain aspects, the processor 1004 has circuitry configured to implement the code stored in the computer-readable medium/memory 1012. The processor 1004 includes circuitry for transmitting 1022, circuitry for receiving 1024, circuitry for allocating 1026, and/or circuitry for monitoring 1028.

Figure 11:
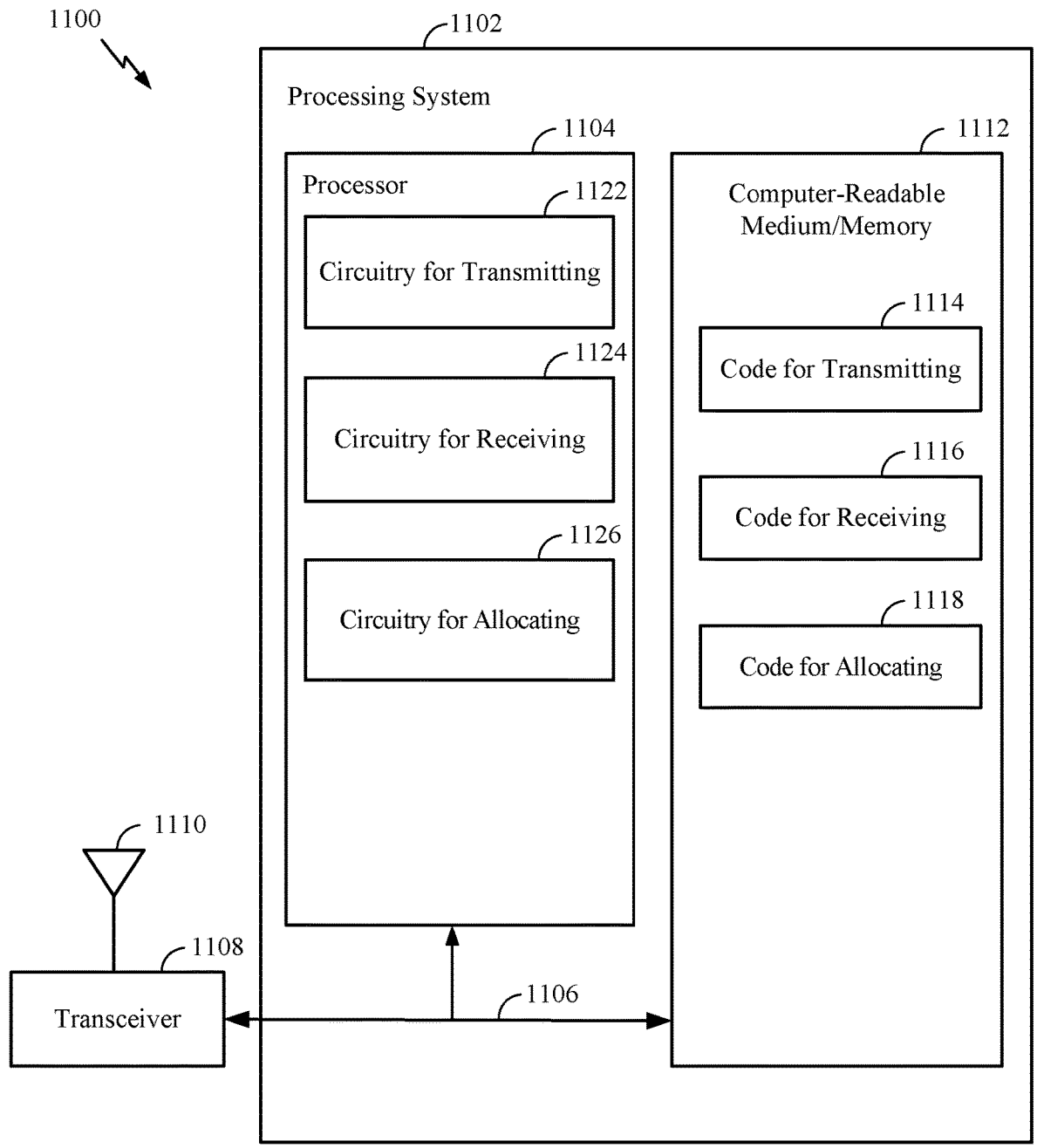
FIG. 11 illustrates a communications device (e.g., a BS or network controller) that may include various components configured to perform operations for the techniques disclosed herein in accordance with aspects of the present disclosure.

FIG. 11 illustrates a communications device 1100 (e.g., a BS and/or network controller) that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for allocating a blind decoding resource budget. In certain aspects, computer-readable medium/memory 1112 stores code for transmitting 1114, code for receiving 1116, and/or code for allocating 1118. In certain aspects, the processor 1104 has circuitry configured to implement the code stored in the computer-readable medium/memory 1112. The processor 1104 includes circuitry for transmitting 1122, circuitry for receiving 1124, and/or circuitry for allocating 1126.

Example Aspects

In addition to the various aspects described above, aspects of specific combinations are within the scope of the disclosure, some of which are detailed below:

Aspect 1. A method of wireless communication by an UE, comprising: allocating a resource budget per a span of symbols among a first type of DCI and a second type of DCI, wherein the resource budget includes a number of PDCCH BDs and a number of CCEs supported by the UE; and monitoring, from a network entity, PDCCH candidates in accordance with the allocated resource budget.

Aspect 2. The method of aspect 1, wherein the number of PDCCH blind decodes includes a first number of PDCCH blind decodes associated with the first type of DCI and a second number of PDCCH blind decodes associated with the second type of DCI.

Aspect 3. The method of aspects 1 or 2, wherein the PDCCH candidates includes: a first PDCCH candidate associated with the first type of DCI, and a second PDCCH candidate associated with a second type of DCI, wherein the first PDCCH candidate and the second PDCCH candidate are decodable based on a same blind decode.

Aspect 4. The method of aspect 3, wherein monitoring the PDCCH candidates comprises: receiving and decoding the PDCCH candidates; and counting the first PDCCH candidate towards the first number of PDCCH blind decodes and counting the second PDCCH candidate towards the second number of PDCCH blind decodes, if the first type of DCI or the second type of DCI is detected among the first PDCCH candidate and the second PDCCH candidate of the decoded PDCCH candidates.

Aspect 5. The method of aspect 3, wherein monitoring the PDCCH candidates comprises: receiving and decoding the PDCCH candidates; and counting the first PDCCH candidate towards the first number of PDCCH blind decodes and counting the second PDCCH candidate towards the second number of PDCCH blind decodes if only the first type of DCI is detected among the first PDCCH candidate and the second PDCCH candidate, and counting the second PDCCH candidate towards the second number of PDCCH blind decodes, but not counting the first PDCCH candidate towards the first number of PDCCH blind decodes, if only the second type of DCI is detected among the first PDCCH candidate and the second PDCCH candidate of the decoded PDCCH candidates.

Aspect 6. The method of aspect 3, wherein monitoring the PDCCH candidates comprises counting, before decoding the PDCCH candidates, the first PDCCH candidate towards the first number of PDCCH blind decodes and counting the second PDCCH candidate towards the second number of PDCCH blind decodes separately.

Aspect 7. The method of aspect 3, wherein monitoring the PDCCH candidates comprises: counting, before decoding the PDCCH candidates, the first PDCCH candidate towards the first number of PDCCH blind decodes if PDCCH blind decodes are counted for the PDCCH candidates associated with the first type of DCI before PDCCH blind decodes are counted for the PDCCH candidates associated with the second type of DCI.

Aspect 8. The method according to any of aspects 1-7, wherein the number of CCEs includes a first number of CCEs associated with the first type of DCI and a second number of CCEs associated with the second type of DCI.

Aspect 9. The method of aspect 8, wherein: monitoring the PDCCH candidates comprises processing a plurality of CCEs; the CCEs include a first set of one or more CCEs of a first PDCCH candidate associated with the first type of DCI and a second set of one or more CCEs of a second PDCCH candidate associated with second type of DCI; and the first set of one or more CCEs and the second set of one or more CCEs are able to be processed as a same set of one or more CCEs.

Aspect 10. The method of aspect 9, wherein processing the CCEs comprises: receiving and decoding the PDCCH candidates associated with the CCEs; and counting the first set of one or more CCEs towards the first number of CCEs and counting the second set of one or more CCEs towards the second number of CCEs, if the first type of DCI or the second type of DCI is detected among the first PDCCH candidate and the second PDCCH candidate of the decoded PDCCH candidates.

Aspect 11. The method of aspect 9, wherein processing the CCEs comprises: receiving and decoding the first PDCCH candidate and the second PDCCH candidate; and counting the first set of one or more CCEs towards the first number of CCEs and counting the second set of one or more CCEs towards the second number of CCEs, if only the first type of DCI is detected among the first PDCCH candidate and the second PDCCH candidate, and counting the second set of one or more CCEs towards the second number of CCEs, but not counting the first set of one or more CCEs towards the first number of CCEs, if only the second type of DCI is detected among the first PDCCH candidate and the second PDCCH candidate.

Aspect 12. The method of aspect 9, wherein processing the CCEs comprises counting, before decoding the PDCCH candidates, the first set of one or more CCE towards the first number of CCEs and counting the second set of one or more CCE towards the second number of CCEs separately.

Aspect 13. The method of aspect 9, wherein processing the CCEs comprises: counting, before decoding the PDCCH candidates, the first set of one or more CCE towards the first number of CCEs if CCEs are counted for the PDCCH candidates associated with the first type of DCI before CCEs are counted for the PDCCH candidates associated with the second type of DCI.

Aspect 14. The method according to any of aspects 1-13, wherein: the first type of DCI is associated with a first type of wireless communication service; the second type of DCI is associated with a second type of wireless communication service; and the span of symbols comprises consecutive symbols in a slot.

Aspect 15. A method of wireless communication by a network entity, comprising: allocating a resource budget per a span of symbols among a first type of DCI and a second type of DCI, wherein the resource budget includes a number of PDCCH BDs and a number of CCEs supported by an UE; transmitting, to the UE, signals indicating DCI via one or more PDCCH candidates allocated to the resource budget; and communicating with the UE based on the indicated DCI.

Aspect 16. The method of aspect 15, wherein the number of PDCCH blind decodes includes a first number of PDCCH blind decodes associated with the first type of DCI and a second number of PDCCH blind decodes associated with the second type of DCI.

Aspect 17. The method of aspects 15 or 16, wherein the PDCCH candidates include: a first PDCCH candidate associated with the first type of DCI, and a second PDCCH candidate associated with a second type of DCI, wherein the first PDCCH candidate and the second PDCCH candidate are decodable based on a same blind decode.

Aspect 18. The method of aspect 17, wherein transmitting the PDCCH candidates comprises: counting the first PDCCH candidate towards the first number of PDCCH blind decodes and counting the second PDCCH candidate towards the second number of PDCCH blind decodes, if the first type of DCI or the second type of DCI is transmitted via the first PDCCH candidate or the second PDCCH candidate.

Aspect 19. The method of aspect 17, wherein transmitting the PDCCH candidates comprises: counting the first PDCCH candidate towards the first number of PDCCH blind decodes and counting the second PDCCH candidate towards the second number of PDCCH blind decodes, if only the first type of DCI is transmitted among the first PDCCH candidate and the second PDCCH candidate, and counting the second PDCCH candidate towards the second number of PDCCH blind decodes, but not counting the first PDCCH candidate towards the first number of PDCCH blind decodes, if only the second type of DCI is transmitted among the first PDCCH candidate and the second PDCCH candidate.

Aspect 20. The method of aspect 17, wherein transmitting the PDCCH candidates comprises counting the first PDCCH candidate towards the first number of PDCCH blind decodes and counting the second PDCCH candidate towards the second number of PDCCH blind decodes separately.

Aspect 21. The method of aspect 17, wherein transmitting the PDCCH candidates comprises: counting the first PDCCH candidate towards the first number of PDCCH blind decodes if PDCCH blind decodes are counted for the PDCCH candidates associated with the first type of DCI before PDCCH blind decodes are counted for the PDCCH candidates associated with the second type of DCI.

Aspect 22. The method according to any of aspects 15-21, wherein the number of CCEs includes a first number of CCEs associated with the first type of DCI and a second number of CCEs associated with the second type of DCI.

Aspect 23. The method of aspect 22, wherein the PDCCH candidates include: a first set of one or more CCEs of a first PDCCH candidate associated with the first type of DCI, and a second set of one or more CCEs of a second PDCCH candidate associated with second type of DCI, wherein the first set of one or more CCEs and the second set of one or more CCEs are able to be processed as a same set of one or more CCEs.

Aspect 24. The method of aspect 23, wherein transmitting the PDCCH candidates comprises: counting the first set of one or more CCEs towards the first number of CCEs and counting the second set of one or more CCEs towards the second number of CCEs, if the first type of DCI or the second type of DCI is transmitted via the first PDCCH candidate or the second PDCCH candidate.

Aspect 25. The method of aspect 23, wherein transmitting the PDCCH candidates comprises: counting the first set of one or more CCEs towards the first number of CCEs and counting the second set of one or more CCEs towards the second number of CCE, if only the first type of DCI is transmitted among the first PDCCH candidate and the second PDCCH candidate, and counting the second set of one or more CCEs towards the second number of CCEs, but not counting the first set of one or more CCEs towards the first number of CCEs, if only the second type of DCI is transmitted among the first PDCCH candidate and the second PDCCH candidate.

Aspect 26. The method of aspect 23, wherein transmitting the PDCCH candidates comprises counting the first set of one or more CCE towards the first number of CCEs and counting the second set of one or more CCE towards the second number of CCEs separately.

Aspect 27. The method of aspect 23, wherein transmitting the PDCCH candidates comprises: counting the first set of one or more CCE towards the first number of CCEs if CCEs are counted for the PDCCH candidates associated with the first type of DCI before CCEs are counted for the PDCCH candidates associated with the second type of DCI.

Aspect 28. The method according to any of aspects 15-27, wherein: the first type of DCI is associated with a first type of wireless communication service; the second type of DCI is associated with a second type of wireless communication service; and the span of symbols comprises consecutive symbols in a slot.

Aspect 29. An apparatus for wireless communication, comprising: a memory; a processor coupled to the memory, the processor and the memory being configured to allocate a resource budget per a span of symbols among a first type of DCI and a second type of DCI, wherein the resource budget includes a number of PDCCH BDs and a number of CCEs supported by the apparatus; and a receiver configured to monitor, from a network entity, PDCCH candidates in accordance with the allocated resource budget.

Aspect 30. An apparatus for wireless communication, comprising: a memory; a processor coupled to the memory, the processor and the memory being configured to allocate a resource budget per a span of symbols among a first type of DCI and a second type of DCI, wherein the resource budget includes a number of PDCCH BDs and a number of CCEs supported by an UE; and a transceiver configured to: transmit, to the UE, signals indicating DCI via one or more of the PDCCH candidates allocated to the resource budget, and communicate with the UE based on the indicated DCI.

Aspect 31. A method of wireless communication by an UE, comprising: allocating a resource budget per a span of symbols among a first type of DCI and a second type of DCI, wherein the resource budget includes a number of PDCCH BDs and a number of CCEs supported by the UE; and monitoring, from a base station, for PDCCH candidates in accordance with the allocated resource budget.

Aspect 32. The method of aspect 31, wherein the number of PDCCH blind decodes includes a first number of PDCCH blind decodes associated with the first type of DCI and a second number of PDCCH blind decodes associated with the second type of DCI.

Aspect 33. The method of aspect 32, wherein a summation of the first number of PDCCH blind decodes and the second number of PDCCH blind decodes is less than or equal to a first threshold value.

Aspect 34. The method of aspect 33, wherein the first number of PDCCH blind decodes is less than or equal to a second threshold value and the second number of PDCCH blind decodes is less than or equal to a third threshold value.

Aspect 35. The method of aspect 34, wherein the second threshold value and the third threshold value are allocated from the first threshold value according to a configured ratio between the first type of DCI and the second type of DCI.

Aspect 36. The method of aspect 34, wherein the second threshold value and the third threshold value are determined by a PDCCH configuration associated with the first type of DCI and the second type of DCI.

Aspect 37. The method of aspect 36, wherein: the PDCCH configuration includes a first number of PDCCH candidates associated with first search spaces configured for the first type of DCI and a second number of PDCCH candidates associated with second search spaces configured for the second type of DCI; the second threshold value is proportional to the first number of PDCCH candidates; and the third threshold value is proportional to the second number of PDCCH candidates.

Aspect 38. The method according to any of aspects 32-37, wherein the PDCCH candidates includes: a first PDCCH candidate associated with the first type of DCI, and a second PDCCH candidate associated with a second type of DCI, wherein the first PDCCH candidate and the second PDCCH candidate are decodable based on a same blind decode.

Aspect 39. The method of aspect 38, wherein the first PDCCH candidate and the second PDCCH candidate are decodable based on the same blind decode if at least one or more conditions are met, wherein the conditions include: the first PDCCH candidate and the second PDCCH candidate are in a same CORESET; the first PDCCH candidate and the second PDCCH candidate use a same set of CCEs; the first PDCCH candidate and the second PDCCH candidate have identical scrambling; or the first type of DCI associated with the first PDCCH candidate and the second type of DCI associated with the second PDCCH candidate have a same DCI size.

Aspect 40. The method of aspects 38 or 39, wherein monitoring for the PDCCH candidates comprises: receiving and decoding the PDCCH candidates; and counting the first PDCCH candidate towards the first number of PDCCH blind decodes and counting the second PDCCH candidate towards the second number of PDCCH blind decodes.

Aspect 41. The method of aspects 38 or 39, wherein monitoring for the PDCCH candidates comprises: receiving and decoding the PDCCH candidates; and counting the first PDCCH candidate towards the first number of PDCCH blind decodes and counting the second PDCCH candidate towards the second number of PDCCH blind decodes if only the first type of DCI is detected, and counting the second PDCCH candidate towards the second number of PDCCH blind decodes, but not counting the first PDCCH candidate towards the first number of PDCCH blind decodes, if only the second type of DCI is detected.

Aspect 42. The method of aspects 38 or 39, wherein monitoring for the PDCCH candidates comprises counting, before decoding the PDCCH candidates, the first PDCCH candidate towards the first number of PDCCH blind decodes and counting the second PDCCH candidate towards the second number of PDCCH blind decodes separately.

Aspect 43. The method of aspects 38 or 39, wherein monitoring for the PDCCH candidates comprises: counting, before decoding the PDCCH candidates, the first PDCCH candidate towards the first number of PDCCH blind decodes if PDCCH blind decodes are counted for the PDCCH candidates associated with the first type of DCI before PDCCH blind decodes are counted for the PDCCH candidates associated with the second type of DCI.

Aspect 44. The method of aspects 38 or 39, wherein monitoring for the PDCCH candidates comprises: counting, before decoding the PDCCH candidates, the second PDCCH candidate towards the second number of PDCCH blind decodes if PDCCH blind decodes are counted for the PDCCH candidates associated with the second type of DCI before PDCCH blind decodes are counted for the PDCCH candidates associated with the first type of DCI.

Aspect 45. The method according to any of aspects 31-44, wherein the number of CCEs includes a first number of CCEs associated with the first type of DCI and a second number of CCEs associated with the second type of DCI.

Aspect 46. The method of aspect 45, wherein a summation of the first number of CCEs and the second number of CCEs is less than or equal to a fourth threshold value.

Aspect 47. The method of aspect 46, wherein the first number of CCEs is less than or equal to a fifth threshold value and the second number of CCEs is less than or equal to a sixth threshold value.

Aspect 48. The method of aspect 47, wherein the fifth threshold value and the sixth threshold value are determined from the fourth threshold according to a configured ratio between the first type of DCI and the second type of DCI.

Aspect 49. The method of aspect 47, wherein the fifth threshold value and the sixth threshold value are determined by a PDCCH configuration associated with the first type of DCI and the second type of DCI.

Aspect 50. The method of aspect 49, wherein: the PDCCH configuration includes a first number of PDCCH candidates associated with first search spaces configured for the first type of DCI and a second number of PDCCH candidates associated with second search spaces configured for the second type of DCI; the fifth threshold value is proportional to the first number of PDCCH candidates; and the sixth threshold value is proportional to the second number of PDCCH candidates.

Aspect 51. The method according to any of aspects 45-50, wherein: monitoring for the PDCCH candidates comprises processing a plurality of CCEs; the CCEs include a first set of one or more CCEs of a first PDCCH candidate associated with the first type of DCI and a second set of one or more CCEs of a second PDCCH candidate associated with second type of DCI; the first set of one or more CCEs and the second set of one or more CCEs are able to be processed as a same set of one or more CCEs.

Aspect 52. The method of aspect 51, wherein the first set of one or more CCEs and the second set of one or more CCEs are able to be processed as the same set of one or more CCEs if at least one or more conditions are met, wherein the conditions include: the first set of one or more CCEs and the second set of one or more CCEs are in a same CORESET; the first set of CCEs and the second set of one or more CCEs use a same set of REs; or the first PDCCH candidate and the second PDCCH candidate have a same first symbol.

Aspect 53. The method of aspects 51 or 52, wherein processing the CCEs comprises: receiving and decoding the PDCCH candidates associated with the CCEs; and counting the first set of one or more CCEs towards the first number of CCEs and counting the second set of one or more CCEs towards the second number of CCEs.

Aspect 54. The method of aspects 51 or 52, wherein processing the CCEs comprises: receiving and decoding the first PDCCH candidate and the second PDCCH candidate; and counting the first set of one or more CCEs towards the first number of CCEs and counting the second set of one or more CCEs towards the second number of CCEs, if only the first type of DCI is detected, and counting the second set of one or more CCEs towards the second number of CCEs, but not counting the first set of one or more CCEs towards the first number of CCEs, if only the second type of DCI is detected.

Aspect 55. The method of aspects 51 or 52, wherein processing the CCEs comprises counting, before decoding the PDCCH candidates, the first set of one or more CCE towards the first number of CCEs and counting the second set of one or more CCE towards the second number of CCEs separately.

Aspect 56. The method of aspects 51 or 52, wherein processing the CCEs comprises: counting, before decoding the PDCCH candidates, the first set of one or more CCE towards the first number of CCEs if CCEs are counted for the PDCCH candidates associated with the first type of DCI before CCEs are counted for the PDCCH candidates associated with the second type of DCI.

Aspect 57. The method of aspects 51 or 52, wherein processing the CCEs comprises: counting the second set of one or more CCEs towards the second number of CCEs if CCEs are counted for the PDCCH candidates associated with the second type of DCI before CCEs are counted for the PDCCH candidates associated with the first type of DCI.

Aspect 58. The method according to any of aspects 31-57, wherein: the first type of DCI is associated with a first type of wireless communication service; and the second type of DCI is associated with a second type of wireless communication service.

Aspect 59. The method of aspect 58, wherein: the first type of wireless communication service comprises an URLLC service; and the second type of wireless communication service comprises an eMBB service.

Aspect 60. The method of aspect 58, wherein: the first type of wireless communication service comprises an NR Release 16 service; and the second type of wireless communication service comprises an NR Release 15 service.

Aspect 61. The method according to any of aspects 31-60, wherein the span of symbols comprises consecutive symbols of a slot.

Aspect 62. The method according to any of aspects 31-61, wherein: monitoring for the PDCCH candidates comprises: receiving, from the base station, control signals indicating DCI via the PDCCH candidates; decoding the PDCCH candidates associated with the control signals; and communicating with the base station based on the indicated DCI.

Aspect 63. A method of wireless communication by a network entity, comprising: allocating a resource budget per a span of symbols among a first type of DCI and a second type of DCI, wherein the resource budget includes a number of PDCCH BDs and a number of CCEs supported by an UE; transmitting, to the UE, signals indicating DCI via PDCCH candidates allocated to the resource budget; and communicating with the UE based on the indicated DCI.

Aspect 64. The method of aspect 63, wherein the number of PDCCH blind decodes includes a first number of PDCCH blind decodes associated with the first type of DCI and a second number of PDCCH blind decodes associated with the second type of DCI.

Aspect 65. The method of aspect 64, wherein the summation of the first number of PDCCH blind decodes and the second number of PDCCH blind decodes is less than or equal to a first threshold value.

Aspect 66. The method of aspect 65, wherein the first number of PDCCH blind decodes is less than or equal to a second threshold value and the second number of PDCCH blind decodes is less than or equal to a third threshold value.

Aspect 67. The method of aspect 66, wherein the second threshold value and the third threshold value are allocated from the first threshold value according to a configured ratio between the first type of DCI and the second type of DCI.

Aspect 68. The method of aspect 66, wherein the second threshold value and the third threshold value are determined by a PDCCH configuration associated with the first type of DCI and the second type of DCI.

Aspect 69. The method of aspect 68, wherein: the PDCCH configuration includes a first number of PDCCH candidates associated with first search spaces configured for the first type of DCI and a second number of PDCCH candidates associated with second search spaces configured for the second type of DCI; the second threshold value is proportional to the first number of PDCCH candidates; and the third threshold value is proportional to the second number of PDCCH candidates.

Aspect 70. The method according to any of aspects 64-69, wherein the PDCCH candidates include: a first PDCCH candidate associated with the first type of DCI, and a second PDCCH candidate associated with a second type of DCI, wherein the first PDCCH candidate and the second PDCCH candidate are decodable based on a same blind decode.

Aspect 71. The method of aspect 70, wherein the first PDCCH candidate and the second PDCCH candidate are decodable based on the same blind decode if at least one or more conditions are met, wherein the conditions include: the first PDCCH candidate and the second PDCCH candidate are in a same CORESET; the first PDCCH candidate and the second PDCCH candidate use a same set of CCEs; the first PDCCH candidate and the second PDCCH candidate have identical scrambling; or the first type of DCI associated with the first PDCCH candidate and the second type of DCI associated with the second PDCCH candidate have a same DCI size.

Aspect 72. The method of aspects 70 or 71, wherein transmitting the PDCCH candidates comprises: counting the first PDCCH candidate towards the first number of PDCCH blind decodes and counting the second PDCCH candidate towards the second number of PDCCH blind decodes.

Aspect 73. The method of aspects 70 or 71, wherein transmitting the PDCCH candidates comprises: counting the first PDCCH candidate towards the first number of PDCCH blind decodes and counting the second PDCCH candidate towards the second number of PDCCH blind decodes, if only the first type of DCI is transmitted, and counting the second PDCCH candidate towards the second number of PDCCH blind decodes, but not counting the first PDCCH candidate towards the first number of PDCCH blind decodes, if only the second type of DCI is transmitted.

Aspect 74. The method of aspects 70 or 71, wherein transmitting the PDCCH candidates comprises counting the first PDCCH candidate towards the first number of PDCCH blind decodes and counting the second PDCCH candidate towards the second number of PDCCH blind decodes separately.

Aspect 75. The method of aspects 70 or 71, wherein transmitting the PDCCH candidates comprises: counting the first PDCCH candidate towards the first number of PDCCH blind decodes if PDCCH blind decodes are counted for the PDCCH candidates associated with the first type of DCI before PDCCH blind decodes are counted for the PDCCH candidates associated with the second type of DCI.

Aspect 76. The method of aspects 70 or 71, wherein transmitting the PDCCH candidates comprises: counting the second PDCCH candidate towards the second number of PDCCH blind decodes if PDCCH blind decodes are counted for the PDCCH candidates associated with the second type of DCI before PDCCH blind decodes are counted for the PDCCH candidates associated with the first type of DCI.

Aspect 77. The method according to any of aspects 63-76, wherein the number of CCEs includes a first number of CCEs associated with the first type of DCI and a second number of CCEs associated with the second type of DCI.

Aspect 78. The method of aspect 77, wherein a summation of the first number of CCEs and the second number of CCEs is less than or equal to a fourth threshold value.

Aspect 79. The method of aspect 78, wherein the first number of CCEs is less than or equal to a fifth threshold value and the second number of CCEs is less than or equal to a sixth threshold value.

Aspect 80. The method of aspect 79, wherein the fifth threshold value and the sixth threshold value are allocated from the fourth threshold according to a configured ratio between the first type of DCI and the second type of DCI.

Aspect 81. The method of aspect 79, wherein the fifth threshold value and the sixth threshold value are determined by a PDCCH configuration associated with the first type of DCI and the second type of DCI.

Aspect 82. The method of aspect 81, wherein: the PDCCH configuration includes a first number of PDCCH candidates associated with first search spaces configured for the first type of DCI and a second number of PDCCH candidates associated with second search spaces configured for the second type of DCI; the fifth threshold value is proportional to the first number of PDCCH candidates; and the sixth threshold value is proportional to the second number of PDCCH candidates.

Aspect 83. The method according to any of aspects 77-82, wherein the PDCCH candidates include: a first set of one or more CCEs of a first PDCCH candidate associated with the first type of DCI, and a second set of one or more CCEs of a second PDCCH candidate associated with second type of DCI, wherein the first set of one or more CCEs and the second set of one or more CCEs are able to be processed as a same set of one or more CCEs.

Aspect 84. The method of aspect 83, where the first set of one or more CCEs and the second set of one or more CCEs are able to be processed as the same set of one or more CCEs if at least one or more conditions are met, wherein the conditions include: the first set of one or more CCEs and the second set of one or more CCEs are in a same CORESET; the first set of CCEs and the second set of one or more CCEs use a same set of REs; or the first PDCCH candidate and the second PDCCH candidate have a same first symbol.

Aspect 85. The method of aspects 83 or 84, wherein transmitting the PDCCH candidates comprises: counting the first set of one or more CCEs towards the first number of CCEs and counting the second set of one or more CCEs towards the second number of CCEs.

Aspect 86. The method of aspects 83 or 84, wherein transmitting the PDCCH candidates comprises: counting the first set of one or more CCEs towards the first number of CCEs and counting the second set of one or more CCEs towards the second number of CCE, if only the first type of DCI is transmitted, and counting the second set of one or more CCEs towards the second number of CCEs, but not counting the first set of one or more CCEs towards the first number of CCEs, if only the second type of DCI is transmitted.

Aspect 87. The method of aspects 83 or 84, wherein transmitting the PDCCH candidates comprises counting the first set of one or more CCE towards the first number of CCEs and counting the second set of one or more CCE towards the second number of CCEs separately.

Aspect 88. The method of aspects 83 or 84, wherein transmitting the PDCCH candidates comprises: counting the first set of one or more CCE towards the first number of CCEs if CCEs are counted for the PDCCH candidates associated with the first type of DCI before CCEs are counted for the PDCCH candidates associated with the second type of DCI.

Aspect 89. The method of aspects 83 or 84, wherein transmitting the PDCCH candidates comprises: counting the second set of one or more CCEs towards the second number of CCEs if CCEs are counted for the PDCCH candidates associated with the second type of DCI before CCEs are counted for the PDCCH candidates associated with the first type of DCI.

Aspect 90. The method according to any of aspects 63-89, wherein: the first type of DCI is associated with a first type of wireless communication service; and the second type of DCI is associated with a second type of wireless communication service.

Aspect 91. The method of aspect 90, wherein: the first type of wireless communication service comprises an URLLC service; and the second type of wireless communication service comprises an eMBB service.

Aspect 92. The method of aspect 90, wherein: the first type of wireless communication service comprises an NR Release 16 service; and the second type of wireless communication service comprises an NR Release 15 service.

Aspect 93. The method according to any of aspects 63-92, wherein the span of symbols comprises consecutive symbols of a slot.

Aspect 94. An apparatus for wireless communication, comprising: means for allocating a resource budget per a span of symbols among a first type of DCI and a second type of DCI, wherein the resource budget includes a number of PDCCH BDs and a number of CCEs supported by the apparatus; and means for monitoring, from a base station, for PDCCH candidates in accordance with the allocated resource budget.

Aspect 95. An apparatus for wireless communication, comprising: means for allocating a resource budget per a span of symbols among a first type of DCI and a second type of DCI, wherein the resource budget includes a number of PDCCH BDs and a number of CCEs supported by an UE; means for transmitting, to the UE, signals indicating DCI via PDCCH candidates allocated to the resource budget; and means for communicating with the UE based on the indicated DCI.

Aspect 96. A computer readable medium having instructions stored thereon for: allocating a resource budget per a span of symbols among a first type of DCI and a second type of DCI, wherein the resource budget includes a number of PDCCH BDs and a number of CCEs supported by an UE; and monitoring, from a base station, for PDCCH candidates in accordance with the allocated resource budget.

Aspect 97. A computer readable medium having instructions stored thereon for: allocating a resource budget per a span of symbols among a first type of DCI and a second type of DCI, wherein the resource budget includes a number of PDCCH BDs and a number of CCEs supported by an UE; transmitting, to the UE, signals indicating DCI via PDCCH candidates allocated to the resource budget; and communicating with the UE based on the indicated DCI.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
    allocating a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by the UE; and
    monitoring, from a network entity, PDCCH candidates in accordance with the allocated resource budget, wherein the PDCCH candidates include:
        a first PDCCH candidate associated with the first type of DCI, and
        a second PDCCH candidate associated with the second type of DCI, wherein the first PDCCH candidate and the second PDCCH candidate are decodable based on a same blind decode.

2. The method of claim 1, wherein the number of PDCCH blind decodes includes a first number of PDCCH blind decodes associated with the first type of DCI and a second number of PDCCH blind decodes associated with the second type of DCI.

3. The method of claim 1, wherein monitoring the PDCCH candidates comprises:
    receiving and decoding the PDCCH candidates; and
    counting the first PDCCH candidate towards a first number of PDCCH blind decodes associated with the first type of DCI and counting the second PDCCH candidate towards a second number of PDCCH blind decodes associated with the second type of DCI, if the first type of DCI or the second type of DCI is detected among the first PDCCH candidate and the second PDCCH candidate of the decoded PDCCH candidates.

4. The method of claim 1, wherein monitoring the PDCCH candidates comprises:
    receiving and decoding the PDCCH candidates; and
    counting the first PDCCH candidate towards a first number of PDCCH blind decodes associated with the first type of DCI and counting the second PDCCH candidate towards a second number of PDCCH blind decodes associated with the second type of DCI if only the first type of DCI is detected among the first PDCCH candidate and the second PDCCH candidate, and
    counting the second PDCCH candidate towards the second number of PDCCH blind decodes, but not counting the first PDCCH candidate towards the first number of PDCCH blind decodes, if only the second type of DCI is detected among the first PDCCH candidate and the second PDCCH candidate of the decoded PDCCH candidates.

5. The method of claim 1, wherein monitoring the PDCCH candidates comprises counting, before decoding the PDCCH candidates, the first PDCCH candidate towards a first number of PDCCH blind decodes associated with the first type of DCI and counting the second PDCCH candidate towards a second number of PDCCH blind decodes associated with the second type of DCI separately.

6. The method of claim 1, wherein monitoring the PDCCH candidates comprises:
    counting, before decoding the PDCCH candidates, the first PDCCH candidate towards a first number of PDCCH blind decodes if PDCCH blind decodes are counted for the PDCCH candidates associated with the first type of DCI before PDCCH blind decodes are counted for the PDCCH candidates associated with the second type of DCI.

7. The method of claim 1, wherein:
    the first type of DCI is associated with a first type of wireless communication service;
    the second type of DCI is associated with a second type of wireless communication service; and
    the span of symbols comprises consecutive symbols in a slot.

8. A method of wireless communication by a user equipment (UE), comprising:
    allocating a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by the UE, wherein the number of CCEs includes a first number of CCEs associated with the first type of DCI and a second number of CCEs associated with the second type of DCI; and
    monitoring, from a network entity, PDCCH candidates in accordance with the allocated resource budget, wherein:
        monitoring the PDCCH candidates comprises processing a plurality of CCEs;
        the CCEs include a first set of one or more CCEs of a first PDCCH candidate associated with the first type of DCI and a second set of one or more CCEs of a second PDCCH candidate associated with the second type of DCI; and
        the first set of one or more CCEs and the second set of one or more CCEs are able to be processed as a same set of one or more CCEs.

9. The method of claim 8, wherein processing the CCEs comprises:
receiving and decoding the PDCCH candidates associated with the CCEs; and
counting the first set of one or more CCEs towards the first number of CCEs and counting the second set of one or more CCEs towards the second number of CCEs, if the first type of DCI or the second type of DCI is detected among the first PDCCH candidate and the second PDCCH candidate of the decoded PDCCH candidates.

10. The method of claim 8, wherein processing the CCEs comprises:
receiving and decoding the first PDCCH candidate and the second PDCCH candidate; and
counting the first set of one or more CCEs towards the first number of CCEs and counting the second set of one or more CCEs towards the second number of CCEs, if only the first type of DCI is detected among the first PDCCH candidate and the second PDCCH candidate, and
counting the second set of one or more CCEs towards the second number of CCEs, but not counting the first set of one or more CCEs towards the first number of CCEs, if only the second type of DCI is detected among the first PDCCH candidate and the second PDCCH candidate.

11. The method of claim 8, wherein processing the CCEs comprises counting, before decoding the PDCCH candidates, the first set of one or more CCE towards the first number of CCEs and counting the second set of one or more CCE towards the second number of CCEs separately.

12. The method of claim 8, wherein processing the CCEs comprises:
counting, before decoding the PDCCH candidates, the first set of one or more CCE towards the first number of CCEs if CCEs are counted for the PDCCH candidates associated with the first type of DCI before CCEs are counted for the PDCCH candidates associated with the second type of DCI.

13. A method of wireless communication by a network entity, comprising:
allocating a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by a user equipment (UE);
transmitting, to the UE, signals indicating DCI via one or more PDCCH candidates allocated to the resource budget, wherein the PDCCH candidates include:
a first PDCCH candidate associated with the first type of DCI, and
a second PDCCH candidate associated with a second type of DCI, wherein the first PDCCH candidate and the second PDCCH candidate are decodable based on a same blind decode; and
communicating with the UE based on the indicated DCI.

14. The method of claim 13, wherein the number of PDCCH blind decodes includes a first number of PDCCH blind decodes associated with the first type of DCI and a second number of PDCCH blind decodes associated with the second type of DCI.

15. The method of claim 13, wherein transmitting the PDCCH candidates comprises:
counting the first PDCCH candidate towards a first number of PDCCH blind decodes associated with the first type of DCI and counting the second PDCCH candidate towards a second number of PDCCH blind decodes associated with the second type of DCI, if the first type of DCI or the second type of DCI is transmitted via the first PDCCH candidate or the second PDCCH candidate.

16. The method of claim 13, wherein transmitting the PDCCH candidates comprises:
counting the first PDCCH candidate towards a first number of PDCCH blind decodes associated with the first type of DCI and counting the second PDCCH candidate towards a second number of PDCCH blind decodes associated with the second type of DCI, if only the first type of DCI is transmitted among the first PDCCH candidate and the second PDCCH candidate, and
counting the second PDCCH candidate towards the second number of PDCCH blind decodes, but not counting the first PDCCH candidate towards the first number of PDCCH blind decodes, if only the second type of DCI is transmitted among the first PDCCH candidate and the second PDCCH candidate.

17. The method of claim 13, wherein transmitting the PDCCH candidates comprises counting the first PDCCH candidate towards a first number of PDCCH blind decodes associated with the first type of DCI and counting the second PDCCH candidate towards a second number of PDCCH blind decodes associated with the second type of DCI separately.

18. The method of claim 13, wherein transmitting the PDCCH candidates comprises:
counting the first PDCCH candidate towards a first number of PDCCH blind decodes if PDCCH blind decodes are counted for the PDCCH candidates associated with the first type of DCI before PDCCH blind decodes are counted for the PDCCH candidates associated with the second type of DCI.

19. The method of claim 13, wherein:
the first type of DCI is associated with a first type of wireless communication service;
the second type of DCI is associated with a second type of wireless communication service; and
the span of symbols comprises consecutive symbols in a slot.

20. A method of wireless communication by a network entity, comprising:
allocating a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by a user equipment (UE), wherein the number of CCEs includes a first number of CCEs associated with the first type of DCI and a second number of CCEs associated with the second type of DCI;
transmitting, to the UE, signals indicating DCI via one or more PDCCH candidates allocated to the resource budget, wherein the PDCCH candidates include:
a first set of one or more CCEs of a first PDCCH candidate associated with the first type of DCI, and
a second set of one or more CCEs of a second PDCCH candidate associated with the second type of DCI, wherein the first set of one or more CCEs and the second set of one or more CCEs are able to be processed as a same set of one or more CCEs; and
communicating with the UE based on the indicated DCI.

21. The method of claim 20, wherein transmitting the PDCCH candidates comprises:
counting the first set of one or more CCEs towards the first number of CCEs and counting the second set of one or more CCEs towards the second number of CCEs, if the first type of DCI or the second type of DCI is transmitted via the first PDCCH candidate or the second PDCCH candidate.

22. The method of claim 20, wherein transmitting the PDCCH candidates comprises:
counting the first set of one or more CCEs towards the first number of CCEs and counting the second set of one or more CCEs towards the second number of CCE, if only the first type of DCI is transmitted among the first PDCCH candidate and the second PDCCH candidate, and
counting the second set of one or more CCEs towards the second number of CCEs, but not counting the first set of one or more CCEs towards the first number of CCEs, if only the second type of DCI is transmitted among the first PDCCH candidate and the second PDCCH candidate.

23. The method of claim 20, wherein transmitting the PDCCH candidates comprises counting the first set of one or more CCE towards the first number of CCEs and counting the second set of one or more CCE towards the second number of CCEs separately.

24. The method of claim 20, wherein transmitting the PDCCH candidates comprises:
counting the first set of one or more CCE towards the first number of CCEs if CCEs are counted for the PDCCH candidates associated with the first type of DCI before CCEs are counted for the PDCCH candidates associated with the second type of DCI.

25. A user equipment (UE) configured for wireless communication, comprising:
a memory comprising computer-executable instructions; and
a processor configured to execute the computer-executable instructions and cause the UE to:
allocate a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by the UE; and
monitor, from a network entity, PDCCH candidates in accordance with the allocated resource budget, wherein the PDCCH candidates include:
a first PDCCH candidate associated with the first type of DCI, and
a second PDCCH candidate associated with the second type of DCI, wherein the first PDCCH candidate and the second PDCCH candidate are decodable based on a same blind decode.

26. A network entity configured for wireless communication, comprising:
a memory comprising computer-executable instructions; and
a processor configured to execute the computer-executable instructions and cause the network entity to:
allocate a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by a user equipment (UE);
transmit, to the UE, signals indicating DCI via one or more PDCCH candidates allocated to the resource budget, wherein the PDCCH candidates include:
a first PDCCH candidate associated with the first type of DCI, and
a second PDCCH candidate associated with a second type of DCI, wherein the first PDCCH candidate and the second PDCCH candidate are decodable based on a same blind decode; and
communicate with the UE based on the indicated DCI.

27. A user equipment (UE) configured for wireless communication, comprising:
a memory comprising computer-executable instructions; and
a processor configured to execute the computer-executable instructions and cause the UE to:
allocate a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by the UE, wherein the number of CCEs includes a first number of CCEs associated with the first type of DCI and a second number of CCEs associated with the second type of DCI; and
monitor, from a network entity, PDCCH candidates in accordance with the allocated resource budget, wherein:
the processor being configured to monitor the PDCCH candidates comprises the processor being configured to process a plurality of CCEs;
the CCEs include a first set of one or more CCEs of a first PDCCH candidate associated with the first type of DCI and a second set of one or more CCEs of a second PDCCH candidate associated with the second type of DCI; and
the first set of one or more CCEs and the second set of one or more CCEs are able to be processed as a same set of one or more CCEs.

28. A network entity configured for wireless communication, comprising:
a memory comprising computer-executable instructions; and
a processor configured to execute the computer-executable instructions and cause the network entity to:
allocate a resource budget per a span of symbols among a first type of downlink control information (DCI) and a second type of DCI, wherein the resource budget includes a number of physical downlink control channel (PDCCH) blind decodes (BDs) and a number of control channel elements (CCEs) supported by a user equipment (UE), wherein the number of CCEs includes a first number of CCEs associated with the first type of DCI and a second number of CCEs associated with the second type of DCI;
transmit, to the UE, signals indicating DCI via one or more PDCCH candidates allocated to the resource budget, wherein the PDCCH candidates include:
a first set of one or more CCEs of a first PDCCH candidate associated with the first type of DCI, and a second set of one or more CCEs of a second PDCCH candidate associated with the second type of DCI, wherein the first set of one or more CCEs and the second set of one or more CCEs are able to be processed as a same set of one or more CCEs; and communicate with the UE based on the indicated DCI.

* * * * *